(12) United States Patent
Anthony et al.

(10) Patent No.: US 6,479,427 B1
(45) Date of Patent: Nov. 12, 2002

(54) SILICO-TITANATES AND THEIR METHODS OF MAKING AND USING

(75) Inventors: Rayford G. Anthony, College Station, TX (US); Robert G. Dosch, deceased, late of Albuquerque, NM (US), by: Janice D. Dosch legal representative; C. V. Philip, College Station, TX (US)

(73) Assignees: The Texas A&M University System, College Station, TX (US); Sandia Corporation, Albuquerque, NM (US)

(*) Notice: Subject to any disclaimer, the term of this patent is extended or adjusted under 35 U.S.C. 154(b) by 0 days.

(21) Appl. No.: 09/503,230

(22) Filed: Feb. 11, 2000

Related U.S. Application Data

(60) Division of application No. 08/507,419, filed as application No. PCT/US94/01718 on Feb. 24, 1994, now Pat. No. 6,110,378, and a continuation-in-part of application No. 08/023,606, filed on Feb. 25, 1993, now abandoned.

(51) Int. Cl.[7] .......................... B01J 21/06; C01B 33/20
(52) U.S. Cl. .................. 502/242; 502/232; 502/233; 502/234; 502/240; 423/326; 423/344
(58) Field of Search .................. 502/232, 233, 502/234, 240, 242; 423/326, 344

(56) References Cited

U.S. PATENT DOCUMENTS

| | | | | |
|---|---|---|---|---|
| 3,329,481 A | * | 7/1967 | Young | 423/333 |
| 4,853,202 A | * | 8/1989 | Kuznicki | 423/326 |
| 4,889,839 A | * | 12/1989 | Chu et al. | 502/242 |
| 4,929,586 A | | 5/1990 | Hegedus et al. | |
| 4,937,222 A | * | 6/1990 | Angevine et al. | 502/242 |
| 4,938,939 A | * | 7/1990 | Kuznicki | 423/326 |
| 4,952,548 A | | 8/1990 | Kato et al. | |
| 5,015,453 A | | 5/1991 | Chapman | |
| 5,160,717 A | * | 11/1992 | Lok et al. | 423/704 |
| 5,177,045 A | | 1/1993 | Anthony et al. | |
| 5,461,022 A | | 10/1995 | Dosch et al. | |
| 5,591,420 A | * | 1/1997 | Balmer | 423/700 |
| 5,882,624 A | * | 3/1999 | Kuznicki et al. | 423/700 |
| 5,935,552 A | * | 8/1999 | Bedard | 423/700 |
| 6,068,682 A | * | 5/2000 | Kuznicki et al. | 423/718 |
| 6,110,378 A | | 8/2000 | Anthony et al. | 210/682 |

OTHER PUBLICATIONS

Kirth–Othmer, *Encyclopedia of Chemical Technology*, Third Ed., vol. 15, 1981, pp. 638–669.

Sandomirskii, P.A. and Belov, N.V.; The OD structure of zorite; *Sov. Phys. Crystallogr.* 24(6), Nov.–Dec. 1979; pp. 686–693.

Sokokova, E.V. et al.; "The crystal structure of a new natural sodium titanosilicate"; *Sov. Phys. Dokl.* 34(7), Jul. 1989; pp. 583–585.

* cited by examiner

*Primary Examiner*—Elizabeth D. Wood
(74) *Attorney, Agent, or Firm*—Baker Botts, L.L.P.

(57) ABSTRACT

Noval silico-titanates and the methods of making and using the said titanates are disclosed. Nb-doped silico-titanates are particularly useful for selectively removing cesuim from radioactive wastes.

19 Claims, 15 Drawing Sheets

SILICO-TITANATES AND THEIR METHODS OF MAKING AND USING

CROSS-REFERENCE TO RELATED APPLICATIONS

The present application is a division of U.S. application Ser. No. 08/507,419, filed Oct. 6, 1995 and granted Aug. 29, 2000 as U.S. Pat. No. 6,110,378 is also a 371 of PCT/US94/01718 and a continuation-in-part of application Ser. No. 08/023,606 now abandoned.

Other related applications are Ser. No. 07/998,997, entitled Thin Film Hydrous Metal Oxide Catalysts, Dosch, et al., filed Dec. 31, 1992, and Ser. No. 07/751,003, entitled Crystalline Titanate Catalyst Supports, Anthony et al, filed Aug. 28, 1991, now U.S. Pat. No. 5,177,045, issued Jan. 5, 1993, the teachings of which are incorporated herein by reference.

GOVERNMENT RIGHTS

The U.S. Government has a paid-up license in this invention under Contract No. DE-AC04-76DP000789 from the United States Department of Energy, and the right in limited circumstances to require the patent owner to license others on reasonable terms as provided for by certain contract terms.

BACKGROUND OF THE INVENTION

1. Field of the Invention

The present invention relates to novel silico-titanate compositions of matter, and methods of making and using such compositions.

2. Background Art

Synthesis of molecular sieves and zeolite-type materials are known to the prior art. The crystalline structure of such materials permits cation or anion exchange (or both) as well as water molecule exchange. Further, such materials not only separate molecules of different size, but are capable of segregating molecules of the same size but of different electrical charge.

Among other uses for molecular sieves, or zeolite-type materials, are as "carriers" for certain volatile catalysts, facilitating chemical reactions. The catalysts are trapped and thereby retained in the zeolite molecular structure during the chemical process. Channelized zeolite-type materials resembling tectosilicates, however, are not the only structures that can effect ion exchange. Several phyllosilicates of clay-like materials, for example, montmorillonite (smectite) and vermiculite, readily exchange cations between the tetrahedral layers.

Syntheses of silicon titanate zeolite-type materials is known to the art. U.S. Pat. No. 3,329,481 to Young, entitled Crystalline Titano-Silicate Zeolites, discloses several Group IV–B metallo-silicate zeolites wherein the metal may be a monovalent or bivalent metal, as well as ammonium or hydrogen.

U.S. Pat. No. 4,938,939, to Kuznicki entitled, Preparation of Small-Pored Crystalline Titanium Molecular Sieve Zeolites, discloses a process of producing crystalline titanium zeolite-type compositions having a pore size of 3–5 Angstroms.

U.S. Pat. No. 4,853,202, also to Kuznicki, entitled Large-Pored Crystalline Titanium Molecular Sieve Zeolites, discloses methods of making crystalline titanium molecular sieve compositions having a pore size of about 8 Angstroms.

"The OD Structure of Zorite" Sandomirskii et al., Sov. Phys. Crystallvgr., 24(6), November–December 1979, discloses the crystallographic structure of a naturally occurring alkaline titanosilicate found in Siberia.

U.S. Pat. No. 5,015,453 to Chapman entitled Crystalline Group IVA, Metal-Containing Molecular Sieve Compositions, discloses titanium-silicates, phosphates and phosphosilicates which are three-dimensional microporous crystalline structures.

"The Crystal Structure of a New Natural Sodium Titanosilicate," by E.V. Sokolova et al., Sov. Phys. Dokl., 34(7), 583–585, July 1989, describes a naturally occurring material, sitinakite, found in the former Soviet Union having an empirical chemical formula of $(Na_{2.251}K_{0.693}Ca_{0.0004}Sr_{0.062}Ba_{0.026}Ce_{0.004})_{\Sigma 3.04} \times (Ti_{3.56}Nb_{0.195}Fe_{0.014}Zr_{0.006})_{\Sigma 4.03}Si_{1.928}O_{13}(O_{0.45}H_{0.955})_{\Sigma 1.00} \times 3.7\ H_2O$ which, as an idealized formula, comprises $Na_2(H_2O)_2[(Ti_4O_5)(OH)(SiO_4)_2]K(H_2O)_{1.7}$. Within this material specimens having higher Nb impurity contents are speculated to have an orthorhombic symmetry.

SUMMARY OF THE INVENTION
(DISCLOSURE OF THE INVENTION)

The present invention relates to silico-titanate compositions (TAMs), structures of these compositions, methods of making these compositions, and methods of using these compositions. The silico-titanate compositions of the present invention (hereafter referred to as "TAM" compositions) reside within the range of the general formula and have a mole ratio of:

$$ySi:aTi;$$

wherein y comprises a coefficient of between 0.01 and 1.7 and preferably less than 1 and a=1.0.

The TAM composition may further comprise a metal dopant (MD) having the general formula zMD to provide the general empirical formula zMD:ySi:aTi, wherein z is a coefficient having a range of approximately 0.0 to 1.0 and y and a have values as defined above. Useful metal dopants include Group III elements, Group V elements, Group IV elements, Group VIII elements, Group I elements, and compounds thereof, particularly niobium, antimony, vanadium, copper, manganese, iron, phosphorus, tantalum and the like.

The composition may further comprise a cation (M), which are at least in part ion-exchangeable, having the general formula xM, in which event the empirical chemical formula is xM:zMD:ySi:aTi, wherein x is a coefficient having a range of approximately 0.0 to 2.0 and, a, y and z have the values set forth above. Useful cations include Group I elements, Group II elements, hydrogen, ammonium cations and alkylammonium cations. The composition may further comprise elements or compounds such as palladium, platinum, rhodium, molybdenum, nickel and sulfur.

The TAM compositions assume different crystalline structures which are dependent upon the atomic elements comprising the TAM composition and, with respect to a given set of atomic elements the atomic ratios existing therebetween. For example, the existence or not of a Group I or II cation (M) constituent distinguishes TAM-3 (no Group I or II cation constituent) from TAM-1, 2, 5, 7 and 8. Wherein a TAM composition contains a cation (M) constituent, the nature of that cation distinguishes TAM-8 (cation is K) from TAM 1, 2, 5 and 7 (cation is Na). Within a line of TAM compositions having an identical cation (M) content, such as Na in the case of TAM-1, 2, 5 and 7, distinctions in the crystalline structures thereof appear in relationship to the atomic ratios of Si:Ti and M(=Na):Si such that at Si:Ti≧1.0 and M:Si:<1.0 the TAM compositions exhibit as a primary x-ray diffraction line one at 2θ<11.00 (TAM-1 and 2) whereas at Si:Ti<1.0 and M:Si>1.0 the TAM compositions exhibit as a primary x-ray diffraction line one at 2θ>9.

The present invention further comprises a method of making silico-titanate compositions and products thereof, the method comprising the steps of:

a) providing a reaction mixture containing a titanium source and a silicon source; and b) allowing the resulting mixture to react to form the silico-titanate compositions discussed above.

The titanium source is provided from titanium alkoxides, titanium halogens, titanium oxides, and the like. The silicon source is provided from silicon alkoxides (such as tetraethyl orthosilicate), colloidal silica, silicon oxides, sodium silicates and the like. The reactor charge mole ratio of Si to Ti is between 0.01 to 1.7.

The present invention also relates to the use of the TAM compositions as well as other crystalline titanosilicates, such as sitinakite, as ion-exchange materials; e.g., for sequestering radioactive cations from aqueous media as ion-exchange thin film supports; in a catalytic reaction or as catalytic supports, for fluid chemical and biochemical selectivity, such as in treating radioactive waste streams and detection of trace metals; sensors to sense the presence of target chemicals and biochemicals; and in a wide variety of processes, including ion exchange hydrotreating, dehydrogenating, oxidation, epoxidation, reduction, photochemical processes, electrochemical processes, hydrocracking, cracking, hydrogenating and the like.

The method of using the TAM compositions of the invention is particularly useful for chemical or biochemical reactions or removing radioactive matter and trace metals from a fluid stream. This method comprises the steps of:

a) providing the silico-titanate composition discussed above, to the fluid stream; and b) permitting the radioactive matter or trace metal in the fluid stream to bind to the silico-titanate composition. Binding is accomplished through ion exchange, adsorption, absorption, size selectivity, and the like. This method is particularly useful for removing radio-isotopes from waste streams, including cesium, strontium, plutonium, cobalt, iodine, technetium, rhenium, ruthenium, nickel, cerium, uranium, neptunium, americium, lanthanides, actinides, and the like.

Doped silico-titanate compositions are preferable for some applications, including the removal of radioisotopes and trace metals from fluid streams. The preferred dopants are from Group III elements, Group V elements, Group IV elements, Group VIII elements, Group I elements, and compounds thereof, such as niobium, antimony, vanadium, copper, manganese, iron, phosphorus, tantalum, and the like.

The compositions of the present invention have unique shapes, not present in prior silico-titanate compositions. These shapes include elongated strands, parallelepipeds having approximately 90 degree angles, cuboids, ellipsoids, spheres, a collection of elongated strands in spheres, and internal ribbed structures bound substantially by silicon compounds.

The new silico-titanate compositions provide for more efficiently segregating radioactive elements or trace metals from waste streams; are serviceable as catalyst supports or in catalytic reactions; and provide new molecular sieve compositions which are relatively unaffected by changes in pH.

An advantage of the invention is the many methods available for synthesis of the new compositions; is the relative ease of doping the new compositions; and the use of the new composition as catalysts or as precursors of catalysts.

Additional advantages and novel features of the invention are set forth in the description which follows and will become apparent to those skilled in the art upon examination of the following or may be learned by practice of the invention.

BRIEF DESCRIPTION OF THE DRAWINGS

The accompanying drawings illustrate several embodiments of the present invention and, together with the description, serve to explain the principles of the invention.

DESCRIPTION OF THE PREFERRED EMBODIMENTS

Figure 1:
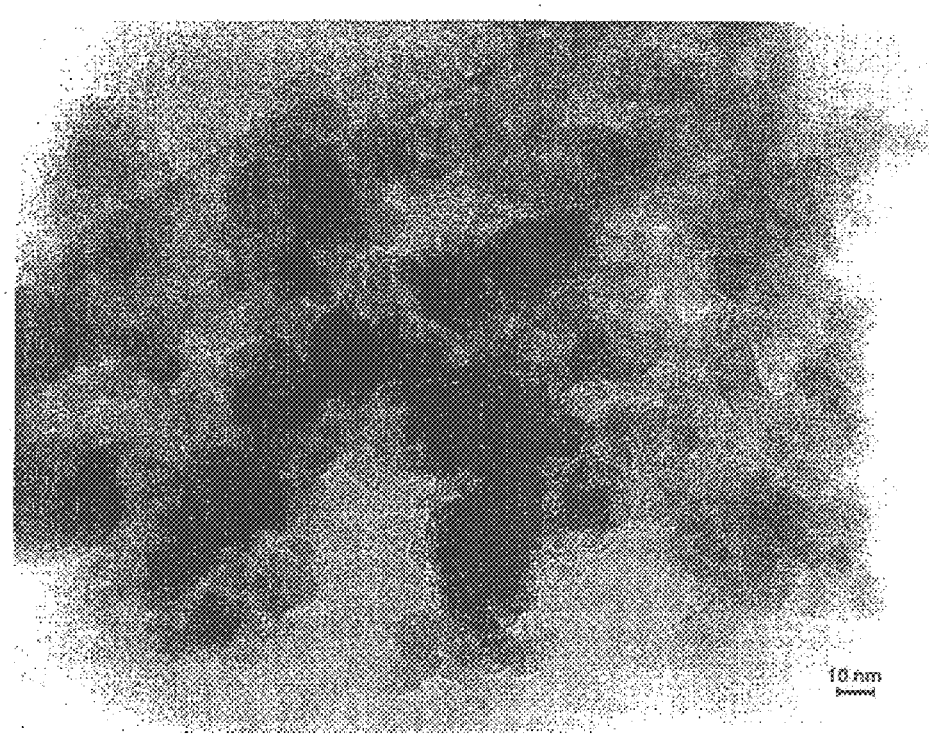
FIG. 1 is a TEM photomicrograph of Nb-doped TAM-5 made in accordance with the present invention.

The present invention provides processes for forming silico-titanate compositions designated herein as TAM-1, TAM-2, TAM-3, TAM-S, TAM-7, and TAM-8, the "TAM" acronym standing for Texas A&M University. The term "silico-titanate" is intended to include silicon titanate, titanium silicate, silicotitanate, TiSi and CST (crystalline silico-titanate). These materials are capable of ion exchange, adsorption, absorption, size selectivity, or other binding. These materials also have the potential of being used as catalysts or catalyst supports combined, for example, with nickel and molybdenum and other metals and compounds (e.g., palladium, platinum, and rhodium) such as disclosed in Ser. No. 07/998,997, entitled Thin Film Hydrous Metal Oxide Catalysts, filed Dec. 31 1992, the teachings of which are incorporated herein by reference. Further, the materials have the capability of acting as ion exchange molecular sieves (size selectivity), as absorbers and adsorbers for a wide range of metals, chemicals, biochemicals, and radio-active materials, for example, radioisotopes of cesium, strontium, plutonium, cobalt, iodine, technetium, rhenium, ruthenium, nickel, cerium, uranium, neptunium, americium, lanthanides, other actinides and the like. The TAM materials are useful in liquid streams, which includes aqueous and non-aqueous liquids, gases and salt solutions.

The electron microscope, spectroscopy, and x-ray diffraction patterns of these novel compositions do not match any known titanate, silicate, titanium silicate, silicon titanate or molecular sieve, thereby indicating new compositions of matter and structures. The materials have a high stability due to their structures and compositions.

Preferred reagents used in the preparation of TAM-1, TAM-2, TAM-3, TAM-5, TAM-7, and TAM-8 include tetraisopropyl titanate (TIPT) as the source of titanium. Other titanium alkoxides can also be used, such as $Ti(OR)_4$ where $R=C_xH_{(2x+1)}$ and x is a positive integer, e.g. $CH_3$, $C_2H_5$, $C_4H_9$, $C_5H_{11}$, titanium halogens, titanium oxides, etc., although any suitable source of Ti may be utilized.

The preferred source of silicon is an alkyl substituent such as tetraethyl orthosilicate (TEOS). Any sources of Si, including colloidal silica, $SiO_2$, sodium silicate, other silicon alkoxides, and the like, may also be employed.

Alcohol or aqueous solutions of NaOH, KOH, and tetramethylammonium hydroxide (TMAH), methanol (MeOH or MEOH), are preferably used as the source of $OH^-$, $K^+$, $Na^+$, and $NH_4^+$ ions. Other alkalis such as CSOH, RbOH, LiOH, $Ba(OH)_2$, tetraalkylammonium hydroxides, for example, tetrapropyl-ammoniumhydroxide, Groups I and II of the periodic table, and the like, can also be used.

Tetrapropylammonium bromide (TPAB), tetrabutylammonium bromide (TBAB), tetrapentylammonium bromide, and the like, may be used as templates in influencing crystal structure; additionally, such reactants may control pH of the reactant mixture. Other alkylammonium salts, amines, and the like, can also be used.

Because the compositions of the present invention have ion exchange properties, they have a wide range of applications in a variety of fluids, including removal of trace metals, including heavy metal cations and anions, from aqueous and non-aqueous waste, for catalytic reactions and supports for hydrotreating, dehydrogenation, hydrocracking, cracking, oxidation, epoxidation, photochemical, electrochemical, reduction and hydrogenation catalysts, as drying agents and as chemical and biochemical sensors.

As noted above, removal of radioisotopes from waste, in particular radioactive Cs, Pu and Sr, is of tantamount interest. Of the various TAM compositions, TAM-5 indicates the highest radioisotope (e.g., Cs) selectivity and is further improved by doping. Useful dopants include numerous elements and compounds, and groups thereof, (including Groups I (B), III, IV, V (A and B) and VIII (B) of the periodic table) such as Nb, V, Cu, Mn, Fe, Ta, P, and the like. The term "metal dopant" is intended to include all such dopants.

Tables 1–5 list in tubular form the mole ratios, reaction times and temperatures used in the preparation of TAM-1 through TAM-5 (undoped and Nb-doped) and TAM-7 and TAM-8. The process temperature range is between 25° C. to 370° C., preferably between 140° C. to 330° C., more preferably between 140° C. to 250° C., and most preferably between 170° C. to 230° C. Process times are between less than one hour to many days, preferably between one hour and 120 hours, and most preferably less than 100 hours.

TABLE 1

MOLE RATIOS, TIME, AND TEMPERATURES USED IN PREPARING TAM-1

| $H_2O$/Ti | TMAH/Ti | NaOH/Ti | TBAB/Ti | Si/Ti | MEOH/Ti | TPAB/Ti | Time, Hours | Temp, ° C. | XRD do, Å |
|---|---|---|---|---|---|---|---|---|---|
| 141 | 0.93 | 0.93 | — | 1.04 | 7.9 | 0.96 | 168 | 170 | 14.7–15 |
| 470 | 1.30 | 1.30 | — | 1.00 | 11.1 | 1.30 | 168 | 170 | 14.7–15 |
| 144 | 1.04 | 1.00 | — | 1.12 | 8.8 | 1.08 | 70 | 170 | 14.7–15 |
| 144 | 1.04 | 1.00 | — | 1.12 | 8.8 | 1.08 | 96 | 170 | 14.7–15 |
| 144 | 1.04 | 1.00 | — | 1.12 | 8.8 | 1.08 | 215 | 170 | 14.7–15 |
| 156 | 1.07 | 1.00 | — | 1.12 | 8.8 | 1.36 | 90 | 170 | 14.7–15 |
| 156 | 1.04 | 1.00 | — | 1.12 | 8.8 | 1.64 | 90 | 170 | 14.7–15 |
| 150 | 2.50 | 1.00 | — | 1.13 | 21.3 | 1.08 | 90 | 170 | 14.7–15 |
| 152 | 4.17 | 1.00 | — | 1.13 | 36.5 | 1.09 | 90 | 170 | 14.7–15 |
| 159 | 1.55 | 0.50 | — | 1.14 | 13.1 | 2.14 | 96 | 170 | 14.7–15 |
| 145 | 1.55 | 1.14 | — | 1.14 | 13.1 | 2.14 | 96 | 170 | 14.7–15 |
| 162 | 1.52 | 0.48 | — | 1.14 | 13.0 | 3.38 | 96 | 170 | 14.7–15 |
| 155 | 1.55 | 1.20 | — | 1.15 | 13.2 | 3.40 | 96 | 170 | 14.7–15 |
| 189 | 1.58 | 1.00 | 2.11 | 1.16 | 13.4 | — | 96 | 170 | 14.7–15 |
| 206 | 1.53 | 1.00 | 3.18 | 1.12 | 13.0 | — | 96 | 170 | 14.7–15 |
| 227 | 1.53 | 1.00 | 4.33 | 1.13 | 13.0 | — | 96 | 170 | 14.7–15 |
| 219 | 1.50 | 1.00 | 3.25* | 1.13 | 12.8 | — | 96 | 170 | 14.7–15 |

MEOH = Methanol
TPAB = Tetrapropylammonium bromide
TBAB = Tetrabutylammonium bromide
TMAH = Tetramethylammonium hydroxide
*tetrapentylammonium bromide
do = largest observed d-spacing in crystal

TABLE 2

MOLE RATIOS, TIME, AND TEMPERATURES USED IN PREPARING TAM-2 AND TAM-3

| $H_2O$/Ti | TMAH/Ti | NaOH/Ti | KOH/Ti | TBAB/Ti | Si/Ti | MEOH/Ti | TPAB/Ti | Time, Hours | Temp, ° C. | XRD do, Å |
|---|---|---|---|---|---|---|---|---|---|---|
| | | | | TAM-2 | | | | | | |
| 37.4 | 1.39 | 0.87 | — | — | 1.0 | 12.4 | 0.09 | 117 | 200 | 8.8–8.9 |
| 37.4 | 1.39 | 0.87 | 000 | 000 | 1.0 | 12.4 | 0.09 | 165 | 200 | 8.8–8.9 |
| 37.4 | 1.39 | 0.87 | — | — | 1.0 | 12.4 | 0.09 | 237 | 200 | 8.8–8.9 |
| 556 | 0.89 | 0.89 | — | — | 1.0 | 7.6 | 1.00 | 168 | 170 | 8.8–8.9 |

TABLE 2-continued

MOLE RATIOS, TIME, AND TEMPERATURES USED IN PREPARING TAM-2 AND TAM-3

| H$_2$O/Ti | TMAH/Ti | NaOH/Ti | KOH/Ti | TBAB/Ti | Si/Ti | MEOH/Ti | TPAB/Ti | Time, Hours | Temp, ° C. | XRD do, Å |
|---|---|---|---|---|---|---|---|---|---|---|
| 1060 | 0.80 | 0.80 | — | — | 1.0 | 6.8 | 0.80 | 168 | 170 | 8.8–8.9 |
| | | | | | TAM-3 | | | | | |
| 150 | 2.69 | — | — | — | 1.15 | 22.9 | — | 96 | 170 | 11.6–11.9 |

TABLE 3

| H$_2$O/Ti | TMAH/Ti | NaOH/Ti | TBAB/Ti | Si/Ti | MEOH/Ti | Time, Hours | Temp., ° C. | XRD do, Å |
|---|---|---|---|---|---|---|---|---|
| 165 | 1.53 | 1.01 | 2.08 | 1.01 | 13.2 | 96 | 170 | 7.85 |
| 150 | — | 2.69 | — | 1.15 | — | 96 | 170 | 8.0 |
| 183 | — | 2.65 | 1.41 | 1.26 | — | 114 | 170 | 8.0 |
| 148 | — | 1.61 | 3.17 | 1.0 | — | 96 | 170 | 7.8 |
| 165 | — | 2.46 | — | 1.13 | — | 120 | 170 | 7.88 |
| 165 | — | 2.46 | — | 1.13 | — | 114 | 200 | 7.89 |
| 30 | — | 2.46 | — | 1.13 | — | 114 | 170 | 7.91 |
| 60 | — | 2.46 | — | 1.13 | — | 114 | 170 | 7.82 |
| 100 | — | 2.46 | — | 1.13 | — | 114 | 170 | 7.91 |
| 165 | — | 2.46 | — | 0.80 | — | 114 | 170 | 7.89 |
| 165 | — | 2.46 | — | 1.13 | — | 72 | 170 | 7.95 |
| 165 | — | 2.46 | — | 1.13 | — | 24 | 200 | 7.95 |
| 165 | — | 2.46 | — | 1.13 | — | 48 | 200 | 7.91 |
| 165 | — | 2.46 | — | 1.13 | — | 24 | 230 | 7.95 |
| 165 | — | 3.00 | — | 1.13 | — | 120 | 170 | 7.92 |
| 80 | — | 2.46 | — | 1.13 | — | 48 | 200 | 8.10 |

TABLE 4

MOLE RATIOS, TIME, AND TEMPERATURES USED IN PREPARING Mb-DOPED TAM-5

| H$_2$O/Ti | NaOH/Ti | Si/Ti | Mb/Ti | Time, Hours | Temp., ° C. | X rd do, Å |
|---|---|---|---|---|---|---|
| 95 | 2.59 | 1.19 | 0.050 | 120 | 170 | 7.723 |
| 95 | 2.60 | 1.19 | 0.17 | 120 | 170 | 7.761 |
| 95 | 2.60 | 1.19 | 0.04 | 120 | 170 | 7.790 |
| 95 | 2.60 | 1.18 | 1.13 | 120 | 170 | — |
| 103 | 2.95 | 1.36 | 0.20 | 120 | 170 | — |
| 130 | 3.71 | 1.70 | 0.50 | 120 | 170 | — |
| 174 | 4.97 | 2.28 | 1.00 | 120 | 170 | — |
| 73 | 4.77 | 1.45 | 0.40[1] | 120 | 170 | — |
| 35 | 4.77 | 1.45 | 0.40[1] | 120 | 170 | — |
| 111 | 3.60 | 1.57[2] | 0.40 | 120 | 170 | — |
| 121 | 3.45 | 1.59 | 0.41 | 24 | 170 | — |
| 121 | 3.48 | 1.59 | 0.40 | 1 | 200 | 7.851 |

[1]Ti + Mb + partial Na from Hydrous Oxide Si from sodium meta silicate
[2]Ti + Sr + partial Na from Hydrous Oxide.

TABLE 5

MOLE RATIOS, TIME, AND TEMPERATURES USED IN PREPARING TAM-7

| H$_2$O/Ti | TMAH/Ti | NaOH/Ti | TBAB/Ti | Si/Ti | TPAB/Ti | Time Hours | Temp ° C. | XRD do, Å | MeOH/Ti |
|---|---|---|---|---|---|---|---|---|---|
| 97 | 2* | 0.61 | — | 0.25 | 2.42 | 96 | 170 | 9.6–10.7 | — |
| 156 | 3 | 0.25 | 2 | 0.25 | — | 96 | 170 | 9.4–10.2 | — |
| 141 | 3 | 1.25 | 2 | 0.25 | — | 96 | 170 | 8.7–9.6 | — |
| 125 | 3 | 1.50 | 2 | 0.25 | — | 96 | 179 | 9.2–9.9 | — |
| 113 | 3 | 2.0 | — | 0.25 | 2.42 | 96 | 170 | 9.2–10/3 | — |
| FROM HYDROUS GELS | | | | | | | | | |
| 189 | 1.58 | 1.0 | 2.11 | 1.0 | — | 96 | 170 | −10 | 13.4 |
| 189 | 1.58 | 1.0 | 2.11 | 0.5 | — | 96 | 170 | −10 | 13.4 |
| 189 | 1.58 | 1.0 | 2.11 | 0.33 | — | 96 | 170 | −10 | 13.4 |
| 189 | 1.58 | 1.0 | 2.11 | 0.2 | — | 96 | 170 | −10 | 13.4 |

Note:
TAM-S is prepared in an identical manner, but KOH is substituted for NaOH.

EXAMPLES

Preparation of TAM-5 (Undoped)

Example I:1

Undoped TAM-5 was prepared by stirring together 2.00 grams of tetraisopropyl titanate (TIPT) and 1.735 grams of tetraethyl orthosilicate (TEOS). 3.03 ml of 6N NaOH and 9 ml $H_2O$ were added to the TIPT-TEOS mixture. The resulting slurry was stirred and transferred to a stainless steel reactor of sufficient size such that the slurry occupied 80% or less of the reactor volume. The reactor was sealed and heated for 5 days at 170° C. The product was recovered by filtration, washed with $H_2O$ and acetone to remove excess reactants and facilitate drying. Drying was accomplished in flowing air at room temperature.

Three TAM-5 products had resulting mole ratios as follows: Na:Si:Ti=0.8:0.72:1.0; 0.76:0.72:1.0; 0.91:0.70:1.0, and contained 20.7%, 18.8% and 23% by weight of $H_2O$, respectively. All weight loss on heating was due to water loss, and the reaction is reversible. On cooling the water was readily readsorbed.

The amount of Na in the product depended to some extent on how well the samples were washed with water (NaOH forms during washing and is removed). The product is thoroughly defined by a combination of factors including the Si:Ti mole ratio, the alkali hydroxide used, and the mole ratios of other reactants. The reactants do not act independently. It is believed that the structure of the particular TAM compositions involved is governed by the amount of Si in the aqueous phase, in turn depending on the volume of $H_2O$ and the amount of alkali hydroxide present.

The following are examples of TAM-5 (undoped) which were prepared using autoclaves as well as sources of Si other than TEOS.

In each of Examples I:2–4 and 6–7 a first mixture A and a second mixture B were separately prepared and then each was mixed with the other under the conditions described. Mixture A was prepared by adding 76.56 grams NaOH, then 2318.8 grams of $H_2O$ to a beaker and stirring to dissolve the NaOH. Mixture B was prepared by adding 220.99 grams of tetraisopropyltitanate (TIPT) then 183.64 grams of tetraethyl orthosilicate (TEOS) to a beaker and stirring the contents. In Example I:5 a portion of the 2318.8 grams of $H_2O$ was reserved from being added to Mixture A, and after mixtures A and B were mixed, the reserved $H_2O$ was added, as described in that example.

Example I:2

Mixture B was poured into Mixture A slowly while stirring. A 10° C. rise of temperature was observed.

The reaction mixture was placed in an autoclave and a leak test was performed. The mixture was heated to 170° C. At 170° C., the pressure gauge indicated 150 psig. After 120 hours the heater was turned off. A fan was used to help the reactor cool down and the mixture was left to set over night. Thereafter, the supernate was removed, top, middle, bottom, and bulk particles respectively. Particles were filtered and washed with $H_2O$ three times, then with acetone once. The particles were dried in air.

The resulting mole ratios were Na:Si:Ti=0.99:0.74:1.00.

Example I:3

Mixture A was added to the autoclave reactor and heated to 148° C., then the heater was turned off and Mixture B was added by gravity feed while agitating the reactor mixture. The heater was then turned on and the reaction mixture was heated from 148° C. to 170° C. and agitated at 200 rpm. After 72 hours the heater was turned off and the reactor cooled down naturally. The supernate and bulk particles were removed respectively. The bulk particles were uniform in size. The particles were filtered and washed with $H_2O$ three times, then with acetone once, then dried in air. The resulting mole ratios were Na:Si:Ti=0.97:0.76:1.00.

Example I:4

Mixture A was added to the autoclave reactor and heated to 140° C., then the heater was turned off and Mixture B added while agitating the reactor mixture at 45 rpm. The reactor mixture was then heated from 145° C. to 170° C. After temperature reached 170° C. agitation of the reaction mixture was increased to 200 rpm for 10 minutes, then the agitation was stopped. After 72 hours the heater was turned off and the reaction mixture was left to cool down naturally. The supernate, bottom and bulk particles respectively were removed. The particles were filtered and washed with $H_2O$ three times, then with acetone once, then dried in air. The resulting mole ratios were Na:Si:Ti=0.95:0.90:1.00.

Example I:5

In a beaker, weigh 76.56 gram NaOH, then add 762.49 gram $H_2O$. Stir it to dissolve NaOH (Mixture A'). In a beaker, weigh 220.99 gram TIPT, then add 183.64 gram TEOS. Stir it (Mixture B').

Mixture A' was fed into autoclave, then Mixture B' was fed in at 27.5° C. at 80 rpm. Feed the rest of $H_2O$ (1556.3 gram) at 200 rpm. Turn on the heater to 170° C. After ten minutes, turn the rpm back to 80. Keep agitating. After 120 hours, turn off the heater and agitator. Let the reactor cool down naturally. Remove supernate, bottom and bulk particles respectively. Filter the particles and wash with $H_2O$ three times, then with acetone twice. Dry it in air. The resulting mole ratios were Na:Ti=1.07–1.21:1.00 and Si:Ti= 0.77–0.93:1.00.

Example I:6

Mixture A was fed into an autoclave, then Mixture B was fed in at 26° C. at 100 rpm. $N_2$ was fed into the reactor to increase the pressure to 250 psig. The heater was turned up to reach a reaction mixture temperature of 170° C., then the agitator was turned off. After 120 hours the reactor heater was turned off and the reactor cooled down naturally. The supernate, top, middle, bottom and bulk particles respectively were removed. The particles were rinsed with water three times (2 grams $H_2O$/1 gram particle each time), then rinse with acetone three times (2 grams acetone/1 gram particles). Thereafter the particles were dried in air. The resulting mole ratios were Na:Ti=0.78–0.98:1.00 and Si:Ti= 0.69–0.96:1.00. The average mole ratio was Na:Si:Ti= 0.87:0.82:1.00.

Example I:7

Mixture A was fed into an autoclave, then Mixture B was fed in at 27° C. at 150 rpm. The reactor heater was turned on and agitation of the reactor contents was raised to 200 rpm. The wall temperature between the autoclave and the heat jacket was controlled at 228° C., the reactor contents controlled to a temperature of 176° C. After 120 hours, the heater was turned off but agitating continued while the reactor cooled down naturally. Change out the product from the bottom. Filter the product. Wash the filtercake with H$_2$O three times (100 cc H$_2$O/30 gram solid each time). Then wash with acetone three times: 100 cc acetone/30 gram solid each time. The resulting mole ratios were Si:Ti= 0.84–0.95:1.00 and Na:Ti=0.90:1.00.

Examples I:8–12

Examples I:8–12 present other variations in the preparation of a TAM-5 composition as described.

Example I:8

In a beaker, weigh 241.16 gram NaOH, then add 1560.8 gram H$_2$O. Stir it to dissolve NaOH (Mixture A). In a bucket, weigh 578.47 gram TEOS and 696.12 gram TIPT. Stir it. (Mixture B). Feed Mixture A into autoclave, then feed Mixture B at 35° C. at 200 rpm. Turn on the heater. Control the wall temperature between autoclave and heat jacket at 220° C. bulk temperature to rise to 174° C. Keep agitating. After 120 hours, turn off the heater but keep the agitation and let the reactor cool down naturally. Samples taken at 12 hours, 24 hours, 48 hours, 72 hours and 96 hours are taken. Filter the product. Wash the filtercake with H$_2$O three times (100 cc H$_2$O/30 gram solid each time). Then wash with acetone three times (100 cc acetone/30 gram solid each time). The resulting mole ratios were Na:Ti=0.93–1.67:1.00 and Si:Ti-0.86–1.05:1.00.

Example I:9

In a beaker, weigh 1.11 gram NaOH, than add 9.99 gram methanol. Stir it to dissolve NaOH (Mixture A). In a plastic tray, weigh 3.52 gram TIPT, then add 2.92 gram TEOS. Stir it (Mixture B). Take 5.85 Mixture B and add it to Mixture A slowly while agitating (Mixture C). In a beaker, weigh 4.06 gram H$_2$O then add 35.64 gram acetone. Stir it (Mixture D). Add Mixture D into Mixture C slowly while agitating. Let the reaction mixture settle for 0.5 hours. Decant the supernate. Add 33.52 gram H$_2$O to solid phase, stir it, then transfer it to a reactor. After 120 hours at 170° C. remove from the reactor and quench it. Filter the product and wash with H$_2$O three times then with acetone once. Dry it in air. Mole ratios were not determined.

Example I:10

In a beaker, weigh 0.65 gram NaOH, then add 19.06 gram H$_2$O. Stir it to dissolve NaOH (Mixture A). Add 2.55 gram LUDOX SM (30% SiO$_2$ 0.56% Na$_2$O) into Mixture A slowly while agitating (Mixture B). Add 3.20 gram TIPT into Mixture B slowly while agitating. Move reaction mixture into a small bottle reactor. Put reactor into an oven pre-set at 170° C. After 114 hours, remove from reactor. Quench it. Filter it and wash with H$_2$O three times, then with acetone once. Dry it in air. The resulting mole ratios were Na:Si:Ti=0.84:0.83:1.00.

Example I:11

In a beaker, weigh 0.67 gram NaOH, then add 19.04 gam H$_2$O. Stir it to dissolve NaOH (Mixture A). Add 0.47 gram SiO$_2$ (Davison Silica Gel Catalyst Grade 952) into Mixture A. Agitate it for 10 minutes (Mixture B). Add 1.92 gram TIPT into Mixture B slowly while agitating. Move reactor mixture into a small bottle reactor. Put reactor into an oven pre-set at 170° C. After 114 hours, remove from the reactor. Quench it. Filter it with H$_2$O three times, then with acetone once. Dry it in air. The resulting mole ratios were Na:Si:Ti-0.89:0.78:1.00.

Example I:12

In a beaker, weigh 0.43 gram NaOH, then add 18.02 gram H$_2$O. Stir it to dissolve NaOH (Mixture A). Add 1.73 gram sodium silicate solution (percentages by weight) into Mixture A slowly while agitating for 10 minutes (Mixture B) Add 1.92 gram TIPT into Mixture B slowly while agitating. Move reaction mixture into a small bottle reactor. Put reactor into an oven pre-set at 170° C. After 114 hours, remove from the reactor. Quench it. Filter it with H$_2$O three times, then with acetone once. Dry it in air. The resulting mole ratios were Na:Si:Ti=0.86:0.76:1.00.

Preparation of TAM-1, TAM-2, TAM-3, TAM-7 AND TAM-8: Example II

Preparation of TAM-1, TAM-2, TAM-3, TAM-7 and TAM-8, parallels the methods employed in preparation of undoped TAM-5.

TAM-5 (undoped) and TAM-7 compositions were also prepared using amorphous powder serving as the sources of Ti, Si and Na. The amorphous powder is made from TIPT, TEOS and a methanol solution of NaOH.

Preparation of TAM-5 (Nb-doped): Example III

Most of the Nb-doped TAM-5 compositions were from TIPT, TEOS, an aqueous solution of NaOH and pentaethyl niobate (PEN).

One method of preparation of Nb-doped TAM-5 differs from that used for undoped TAM-5 only in the addition of Nb in the alkoxide (pentaethyl niobate or niobium ethoxide, hereinafter PEN). Nb was added without changing the Na, Si or H$_2$O amounts used in the undoped TAM-5 preparation. Other Nb alkoxides or sources of niobium, such as Nb$_2$O$_5$, can also be used.

In the following examples III: 1–7 of prepared compositions, the primary variable was Nb content: charge mole ratios are H$_2$O:Na:Si:(Ti+Nb)=86:2.46:1.13:1.0 for all samples. The mount of H$_2$O was assumed to equal volumes of 6N NaOH+H$_2$O added.

Each of Examples III:1–7 were prepared by first mixing with 1.82 grams of tetraethyl orthosilicate (TEOS) various gram amounts of tetraisopropyltitanate (TIPT) and pentaethyl niobate in an autoclave reactor, as reported in Table III:1–7. Thereafter to such mixture 3.17 ml of 6 N NaOH and 8.8 ml H$_2$O was added with stirring and thereafter the reaction mixture was heated to 170° C. and so maintained under such heat and stirring for 120 hours. The composition of the reaction charge and the weight of recovered product is reported in Table III:1–7.

TABLE III

1–7

| EXPL. III: | TIPT(g) Charge | PEN (g) Charge | TEOS (g) Charge | Wt. Recovered Product | Nb:Ti Recovered Product |
|---|---|---|---|---|---|
| 1 | 2.00 | 0.242 | 1.82 | 1.38 | 0.1 |
| 2 | 1.83 | 0.400 | 1.82 | 1.35 | 0.2 |
| 3 | 1.69 | 0.550 | 1.82 | 1.34 | 0.3 |
| 4 | 1.57 | 0.685 | 1.82 | 1.27 | 0.4 |
| 5 | 1.46 | 0.797 | 1.82 | 1.36 | 0.5 |
| 6 | 1.25 | 1.020 | 1.82 | 1.35 | 0.75 |
| 7 | 1.09 | 1.190 | 1.82 | 1.46 | 1.00 |

In Example IV:1–2, two further examples of Nb doped Si:Ti compositions of TAM-5 were made (note: hydrous niobium pentoxide, a commercial source, was used as the source of niobium), as follows:

Example IV:1

In a beaker, weigh 2.40 grams NaOH, weigh 1.29 grams $Nb_2O_5$, then add 12.25 grams $H_2O$. Mix it for 10 minutes. This is Mixture A. In a plastic tray, weigh 7.59 grams TIPT, add 6.27 grams TEOS. Mix it. This is Mixture B. Add 12.60 grams Mixture B into Mixture A slowly while stirring. It takes 3 minutes to add Mixture B. Mix it for 5 minutes after feeding. This is Mixture C. Add 59.76 grams $H_2O$ into Mixture C. Move the mixture into a 100 ml autoclave, and leak test. Turn on the heater and agitator. It takes about 1 hour to raise the temperature to 230° C. After 60 hours, turn off the heater and agitator. Take off the heater jacket, use a fan to help cool down the reactor. Filter the product. Wash it with water 3 times, 50 ml each time, then wash with acetone 3 times, 50 ml each time. Recovered 4.93 grams product with a mole ratio of Nb:Ti=0.4:1.

Example IV:2

In a beaker, weigh 76.11 grams NaOH, weigh 40.91 grams $Nb_2O_5$, then add 380.55 grams $H_2O$. Mix it for 10 minutes. This is Mixture A. In a plastic container, weigh 218.82 grams TIPT, add 180.77 grams TEOS. Mix it. This is Mixture B. Add Mixture B into Mixture A slowly while stirring. It takes 12 minutes to add Mixture B into Mixture A. Mix it for 10 minutes after feeding. This is Mixture C. Add 1902.83 grams $H_2O$ into mixture C. That takes 20 minutes. Mix it for 10 minutes. Move the reactant mixture into 1 gallon autoclave. Leak test. Turn on the heater and agitator. It takes about 1 hour to raise the temperature to 205° C. After 120 hours, turn off the heater and agitator. Use a fan to help cool down the reactor. Filter the product in two batches, approximately ½ of the product in each batch. Wash each batch with water 3 times, 200 ml each time, then wash with acetone 3 times, 200 ml each time. Total recovered product was 159.61 grams for both filtrations with a mole ratio of Nb:Ti=0.41:1.

Preparation of Ti—Nb and Ti—Nb—Si Hydrous Metal Oxide Precursors: Example V:1–2

Yet another method for producing either undoped TAM-5 or Nb-doped TAM-5 involves the preparation of solid hydrous metal oxide materials. To these hydrous metal oxide precursors were added water, NaOH and additional Si in the form of sodium metasilicate (SMS) to provide proper stoichiometry.

These mixtures were then heated hydrothermally in a reactor to produce undoped TAM-5 or Nb-doped TAM-5.

This particular method allowed more TAM-5 to be produced per unit reactor volume which is of significant economic importance. Perhaps more importantly, the use of hydrous metal oxides as precursors for TAM-5 materials permits the formation of this film on inert supports as disclosed in application Ser. No. 07/998,997, entitled Thin Film Hydrous Metal oxide Catalysts, Dosch, et al., filed Dec. 31, 1992. For example, it is well known to coat high surface area silica gel spheres with thin films (i.e. <10 nm) of hydrous metal oxide materials. Such a material coated with a TAM-5 precursor hydrous metal oxide, when heated hydrothermally, results in a material with an engineering form usable in typical ion exchange units having the Cs adsorption properties of TAM-5 while actually containing only a small fraction of TAM-5, which is a far more expensive material. This thin film preparation approach is applicable to all TAM compositions.

Example V:1
Ti—Nb Hydrous Metal Oxide ($Na_{0.7}Ti_{1.0}Nb_{0.4}$)

To 35.6 gram of TIPT and 15.5 gram PEN (30% Nb) was added to 35.2 gram of 9.94% NaOH in MeOH. The resultant mixture was mixed well and hydrolyzed in 250 ml of acetone and 25 ml of $H_2O$, and thereafter vacuum dried. The product was sieved with −60 mesh and 23 gram of product was recovered. The product composition was 18.43% Nb, 23.76% Ti and 7.98% Na. Subsequently, a film is formed on a silica pellet to provide Si for producing a TAM-5 film or Si is added as in the Example immediately below.

Example V:2
Ti—Nb—Si Hydrous Metal Oxide ($Na_{0.7}Ti_{1.0}Nb_{0.4}Si_{1.4}$)

To 36.6 gram of TIPT, 15.5 gram PEN (30% Nb) and 36.4 gram TEOS was added 35.2 gram of 9.94% NaOH in MeOH. The resultant mixture was mixed well and hydrolyzed in 250 ml of acetone and 25 ml of $H_2O$, and thereafter vacuum dried. The product was sieved with −60 mesh and 28.9 gram of product was recovered. The product composition was 11.58% Nb, 14.92% Ti, 5.01% Na and 12.22% Si.

Preparation of TAM-5 (Nb-doped) Using Hydrous Metal Oxides: Examples VI:1–5

Example VI:1

To 2.0 gram Ti—Nb precursor (above) and 4.1 gram sodium metasilicate (SMS) were added 10 ml $H_2O$ and 1.92 ml 6N NaOH. The resultant mixture was heated in a reactor at 170° C. for 120 hours. 2.67 gram product was recovered after $H_2O$ and acetone washing and air drying. Reactant compositions were as follows:

$H_2O$:Na:Si:Nb:Ti=73:4.77:1.45:0.4:1.0

$H_2O$:Na:Si:Nb+Ti=52:3.4:1.04:1.0

Example VI:2

To 4.0 gram Ti—Nb precursor (above) and 8.2 gram SMS were added 3.84 ml 6N NaOH and 4 ml $H_2O$. The resultant mixture was heated in a reactor at 170° C. for 120 hours. 4.65 gram of product was recovered after $H_2O$ and acetone washing and air drying. Reactant compositions were as follows:

$H_2O$:Na:Si:Nb:Ti=35:4.77:1.45:0.4:1.0

$H_2O$:Na:Si:Nb+Ti=25:3.4:1.04:1.0

Example VI:3

To 2 gram of Ti—Si—Nb precursor (above) and 0.303 gram SMS were added 9.34 ml $H_2O$ and 2.66 ml 6N NaOH. The resultant mixture was heated in a reactor at 170° C. for 120 hours. 1.71 gram product was recovered after $H_2O$ and acetone washing and air drying. Reactant compositions were as follows:

$H_2O$:Na:Si:Nb:Ti=111:3.6:1.57:0.4:1.0

$H_2O$:Na:Si:Nb+Ti=79:2.57:1.12:1.0

Example VI:4

To 4 gram Ti—Si—Nb precursor (above) and 0.606 gram of SMS were added 6.68 ml $H_2O$ and 5.32 ml 6N NaOH. The resultant mixture was heated in a reactor at 170° C. for 120 hours. 3.59 gram product was recovered after $H_2O$ and acetone washing and air drying. Reactant compositions were as follows:

$H_2O:Na: Si:Nb:Ti=60:3.6:1.57:0.4:1.0$ $H_2O:Na: Si:Nb+Ti=43:2.57:1.12:1.0$

Example VI:5

To 6 gram of Ti—Si—Nb precursor (above) and 0.909 gram SMS were added 7.98 ml 6N NaOH and an additional 2 ml of $H_2O$ (due to reactor size limitations). The resultant mixture was heated at 170° C. for 120 hours. 5.66 gram product was recovered after $H_2O$ and acetone washing and air drying. Reactant compositions were as follows:

$H_2O:Na:Si:Nb:Ti=36:3.6:1.57:0.4:1.0$ $H_2O:Na:Si:Nb:Ti=26:2.57:1.12:1.6$

Characterization of the TAM Materials TAM-1

A transmission electron microscope (TEM) examination of TAM-1 revealed that the composition comprised at least four phases. Phase 1 comprises small, flake-like crystalline platelets which, in the aggregate, contain titanium (Ti), oxygen (O), silicon (Si) and sodium (Na) as determined by an energy dispersive x-ray spectroscopy (EDS) analysis of Phase 1. Phase 2 comprises large very-thin parallelepiped platelets comprised primarily of Si and O with a small amount of Ti and possibly a trace of Na, as revealed by an EDS analysis. An EDS analysis of Phase 4 revealed an amorphous Si oxide with a trace of Ti. It is solid, not porous, with an interconnected ball-like morphology. Phase 3 of the TAM-1 composition as determined by TEM observation, is an amorphous, porous, ball-like material comprising high Ti, Si, O and some Na.

In TAM-1 at higher magnification, Phase 1 appears to be similar to a clay-like material. Measurement of the lattice plane spacings shows them to be about 15 Å. This is in good agreement with x-ray diffraction data for clay-like materials. It is believed that Phase 1 of the TAM-1 composition provides the ion exchange and size selectivity properties of TAM-1.

Figure 6:
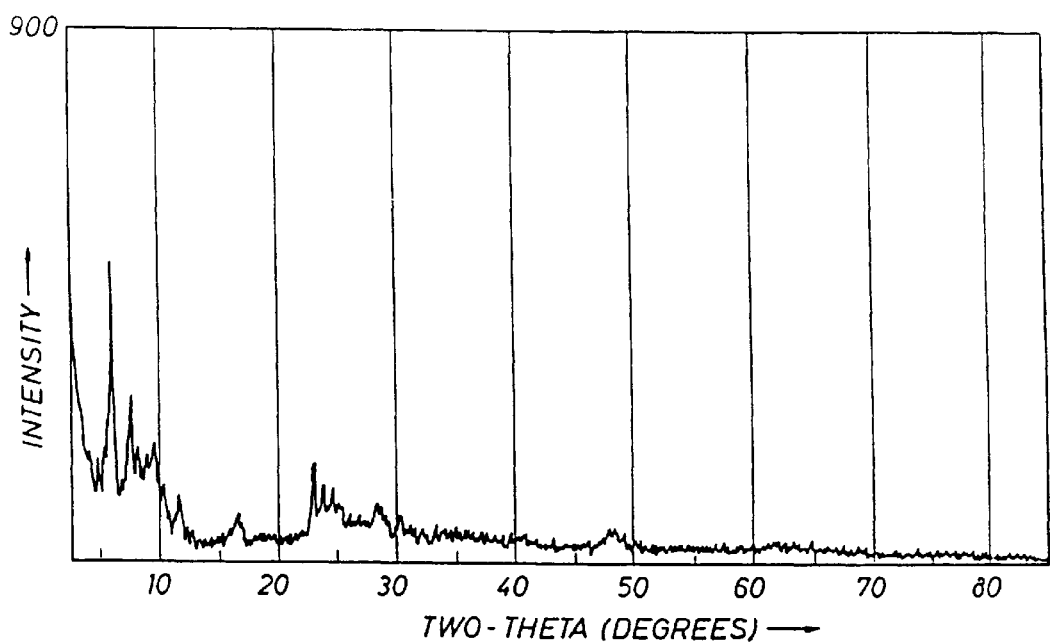
FIG. 6 is an x-ray diffraction pattern for TAM-1.

FIG. 6 is an x-ray diffraction pattern using CuKα x-rays for TAM-1. Table 6 lists 2-theta (degrees), d-spacing (Angstroms) and relative intensities of the pattern.

TABLE 6

Composite List of Principal X-Ray Diffraction Pattern Peaks for TAM-1

| Line No. | 2-theta (degrees) | d-spacing (Angstroms) | Relative Intensities |
|---|---|---|---|
| 1 | 5.9 | 15 | 100 |
| 2 | 7.6 | 11.7 | 54 |
| 3 | 9.4 | 9.4 | 33 |
| 4 | 11.6 | 7.6 | 25.4 |
| 6 | 23.1 | 3.85 | 32 |
| 7 | 23.85 | 3.73 | 21 |
| 8 | 24.6 | 3.6 | 21 |
| 9 | 28.3 | 3.16 | 23 |
| 10 | 48 | 1.88 | 12 |

TAM-2

A TAM observation of the TAM-2 composition showed that it contains at least four phases; the phase mixture is similar to but not the same as that of TAM-1. Phases 1, 2, and 3 of TAM-2 are the same as for Phases 1, 2 and 3 of TAM-1, as established by energy dispersive x-ray spectroscopic analysis, A TEM examination of Phase 4 of TAM-2 revealed it to be a porous interconnecting phase. It is the least prevalent phase of TAM-2. An EDS analysis of Phase 4, showed high Ti, Si and O, but no Na. This phase was not observed in TAM-1.

Figure 7:
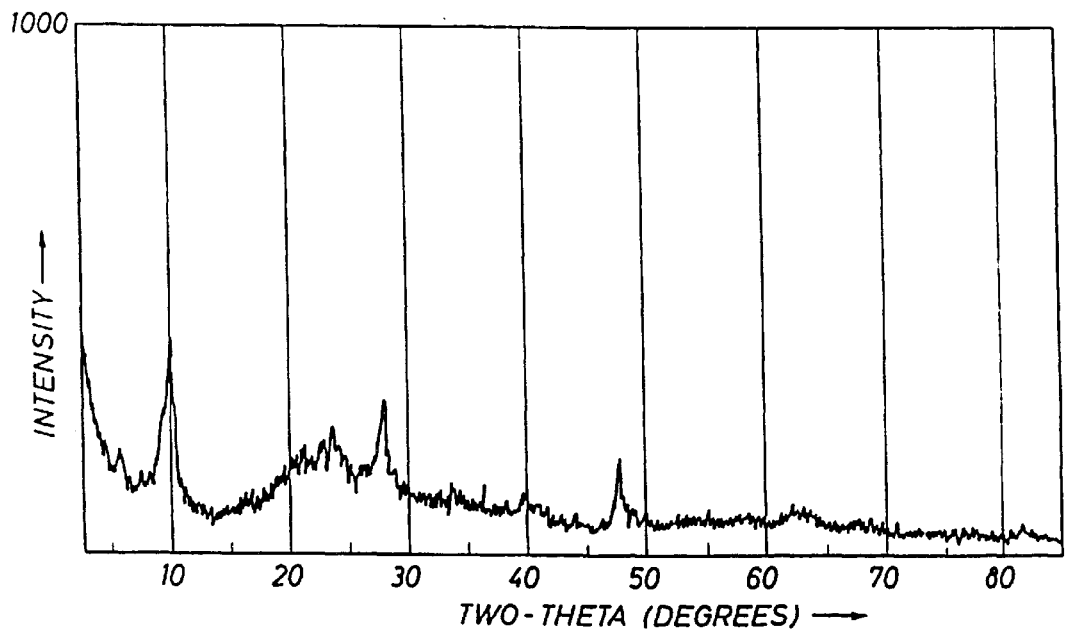
FIG. 7 is an x-ray diffraction pattern for TAM-2.

FIG. 7 is an x-ray diffraction pattern for TAM-2. Table 7 lists 2-theta, d-spacing and relative intensities of the pattern.

TABLE 7

Composite List of Principal X-Ray Diffraction Pattern Peaks for TAM-2

| Line No. | 2-theta (degrees) | d-spacing (Angstroms) | Relative Intensities |
|---|---|---|---|
| 1 | 10.18 | 8.68 | 100 |
| 2 | 21.6 | 4.1 | 21 |
| 3 | 24.7 | 3.6 | 42 |
| 4 | 28 | 3.18 | 68 |
| 6 | 33.7 | 2.65 | 41 |
| 7 | 40.06 | 2.25 | 38 |
| 8 | 47.88 | 1.9 | 64 |

TAM-3

A TAM examination showed at least two phases for TAM-3. Phase 1 is amorphous and appears to be as same as Phase 4 in TAM-1, i.e. silica gel-appearing spheres which contain only Si and O, as shown by an EDS analysis. Phase 2, the primary phase, appears to contain Ti, O and Si, as shown by EDS analysis.

Higher magnification TEM examination of TAM-3 showed what appears to be silica-gel spheres which have coalesced forming a chain-shaped structure. Phase 2 of TAM-3 appears to form within the chain-shaped structure. For example, an energy dispersive x-ray spectroscopic analysis (EDS) of the outer amorphous surface of the chain-shaped structure reveals only the presence of Si and O with a trace of Ti. On the other hand, an EDS analysis of the internal layered rib shows that the layered material found in the center of the chain-like structure contains O, Si, Ti in roughly equal amounts. The lattice spacing of Phase 2, 10 Å–11 Å, agree with d-spacings observed by x-ray diffraction. It is this phase that is believed to be the source of ion exchange and size selectivity properties of TAM-3.

Figure 8:
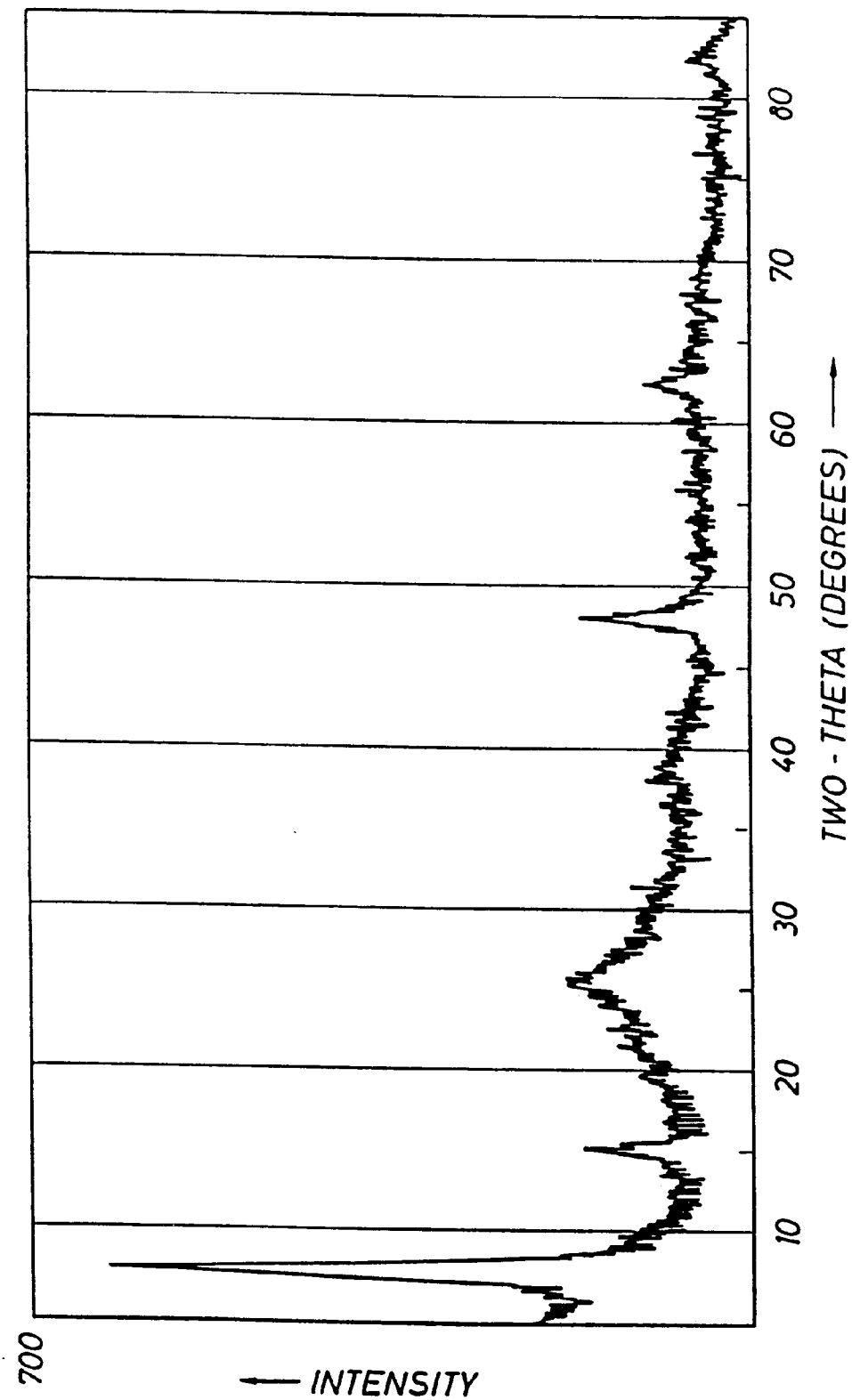
FIG. 8 is an x-ray diffraction pattern for TAM-3.

FIG. 8 is an x-ray diffraction pattern for TAM-3. Table 8 lists 2-theta, d-spacing and relative intensities of the pattern.

TABLE 8

Composite List of Principal X-Ray Diffraction Pattern Peaks for TAM-3

| Line No. | 2-theta (degrees) | d-spacing (Angstroms) | Relative Intensities |
|---|---|---|---|
| 1 | 7.5 | 11.80 | 100 |
| 2 | 15.3 | 5.78 | 20 |
| 3 | 25.5 | 3.47 | 20 |
| 4 | 38.2 | 2.32 | 15 |
| 6 | 48.2 | 1.84 | 25 |
| 7 | 62.5 | 1.42 | 15 |
| 8 | 82.5 | 1.07 | 10 |

TAM-5

A TEM analysis of TAM-5 revealed it to be a 99% single phase composition. This primary phase also appears to be an aggregate of small crystalline cuboidal particles. A very minor phase appears to comprise shard-like particles many microns in length that degenerate under the TEM electron beam. An EDS analysis of the primary phase of TAM-5 revealed Ti, O, Si and Na which is in direct agreement with bulk elemental analyses.

FIG. 1 is a photomicrograph of a sample (like example III:1) of Nb-doped TAM-5. This sample has a Nb:Ti mole ratio of 0.05. Overall reactant mole ratios were H₂O:NaOH:Si:Nb:Ti=95:2.59:1.19:0.05:1.0. This composition is essentially a single phase silico-titanate with minor amounts of Nb, as shown on EDS analysis of aggregated particles. Morphology is cuboidal or otherwise blocky shaped. The largest lattice spacing measured both in selected area diffraction patterns and fringes in high magnification photomicrographs approximated 7.5 Å. This spacing is in good agreement with x-ray diffraction data. The Nb is either dissolved in or substituted in the crystalline lattice as no Nb-rich phases are observed. With the exception of the presence of Nb as shown by the EDS analysis, there is nothing in the TEM examination to differentiate this composition from undoped TAM-5.

Figure 2:
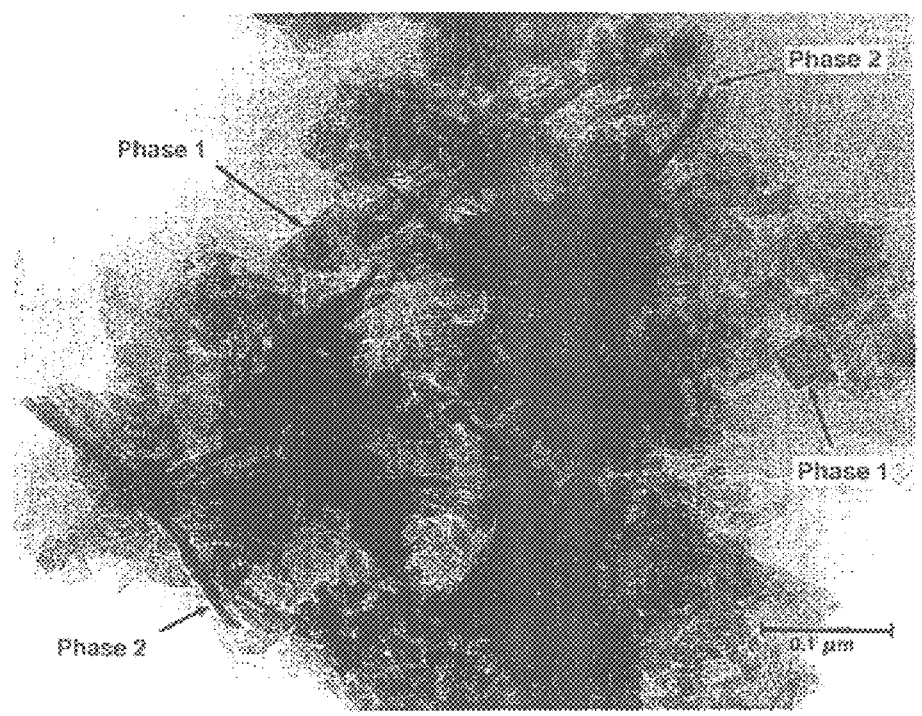
FIG. 2 is a TEM photomicrograph of another sample of Nb-doped TAN-5 made in accordance with the present invention.
Figure 3:
FIG. 3 is a TEM photomicrograph of Phase 1 of Nb-doped TAM-5.
Figure 4:
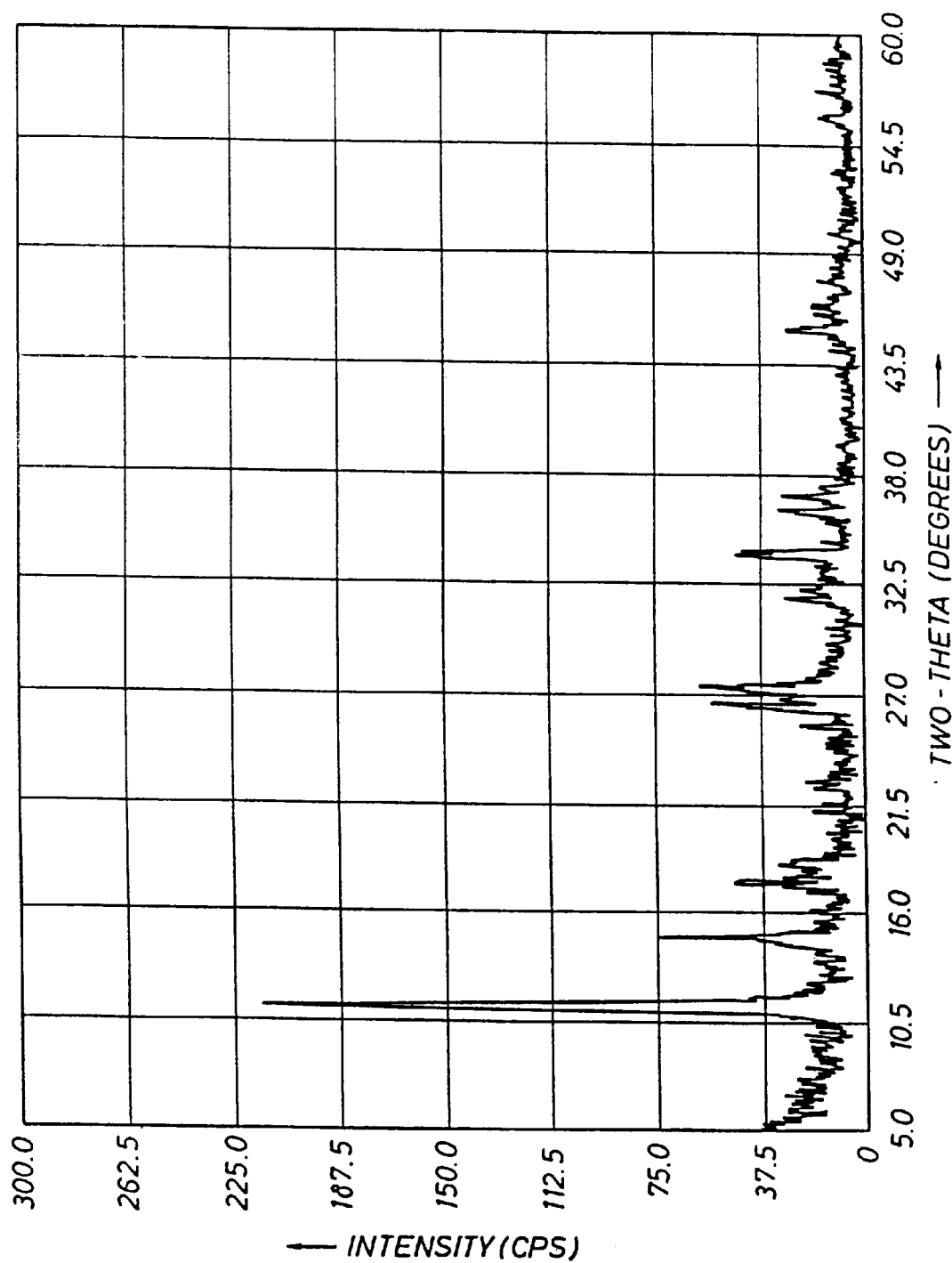
FIG. 4 is an x-ray diffraction data of Nb-doped TAM-5.
Figure 5:
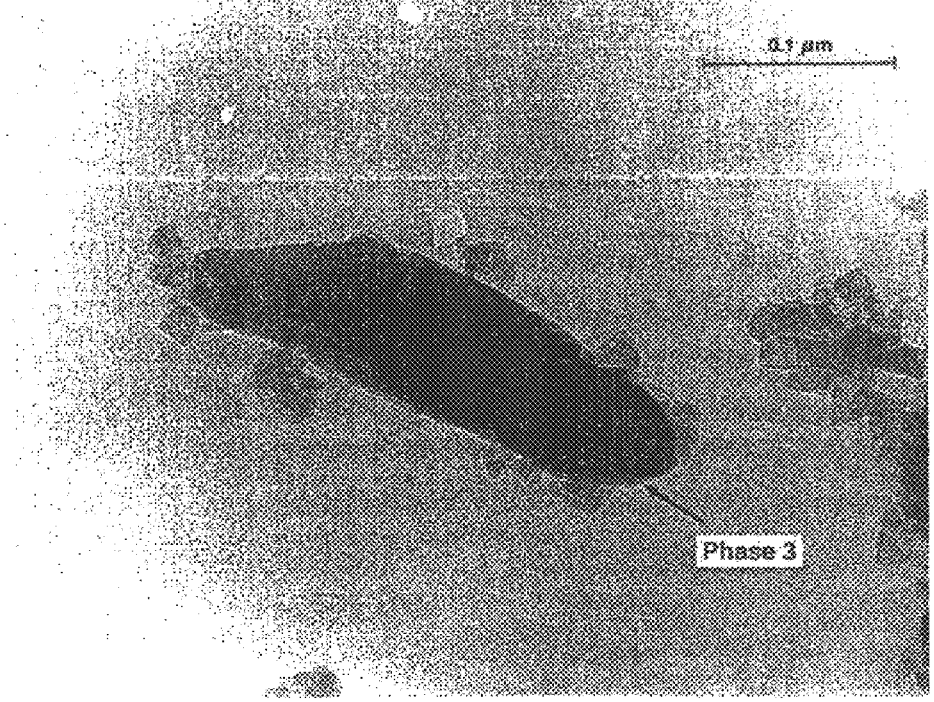
FIG. 5 is a TEM photomicrograph of Phase 3 of Nb-doped TAM-5.

FIG. 2 is a photomicrograph showing a second sample (like example III:6) of Nb-doped TAM-5. This composition contains at least three phases. Phase 1 is the major phase and is the same silica-titanate occurring in FIG. 1, but contains about four times more Nb, either dissolved or substituted in the crystalline lattice. Phase 1 also has a widely varying Na content as shown by EDS analyses. Many of the particles are cuboidal as shown in FIG. 3, although less in number than in the sample of FIG. 1. The mean particle size, however, is larger than that of the sample shown in FIG. 1. Since the reactants for this sample contain approximately eight times more Nb relative to Ti than did the sample of FIG. 1, and the product of this sample contained only about four times more Nb, the conclusion is suggested that about half of the Nb is contained in other phases. Indeed, Phase 2, analyzed by TEM is a Nb—Si—O rich phase with much smaller Ti content than Phase 1. Phase 2, therefore, is assumed to be Nb-silicate containing only a small amount of Ti in solution, as shown by an EDS analysis. It is estimated that Phase 2 contains 10–15% by volume of TAM-5 material. The morphology is flake-like having a layered structure with layer plane spacings of about 11.3. Å, as determined by high magnification photomicrographs. FIG. 4, showing x-ray diffraction data of this TAM-5 composition sample, show the largest d-spacings to be about 7.8 Å. The fact that Phase 2 was not detectable using x-ray diffraction suggests that the 10–15% by volume estimate may be too high. Another minor phase, Phase 3, (1–2% by volume, maximum) was detected. The particles are elongated and cigar shaped; this phase is assumed to be an oxide of Nb. Phase 3, as shown by EDS analyses, contains high Nb and 0 with small amounts of Ti and Si and variable Na.

The phase in this particular Nb-doped TAM-5 composition sample which is believed to provide high Cs selectivity in the presence of Na is Phase 1. This is believed true because: 1) increasing the Nb:Ti mole ratio in the reactants above approximately 0.4 does not result in enhanced Cs selectivity, but rather the opposite, and 2) a composition prepared using an undoped TAM-5 preparation where Nb was substituted for Ti exhibited no Cs selectivity.

Figure 9:
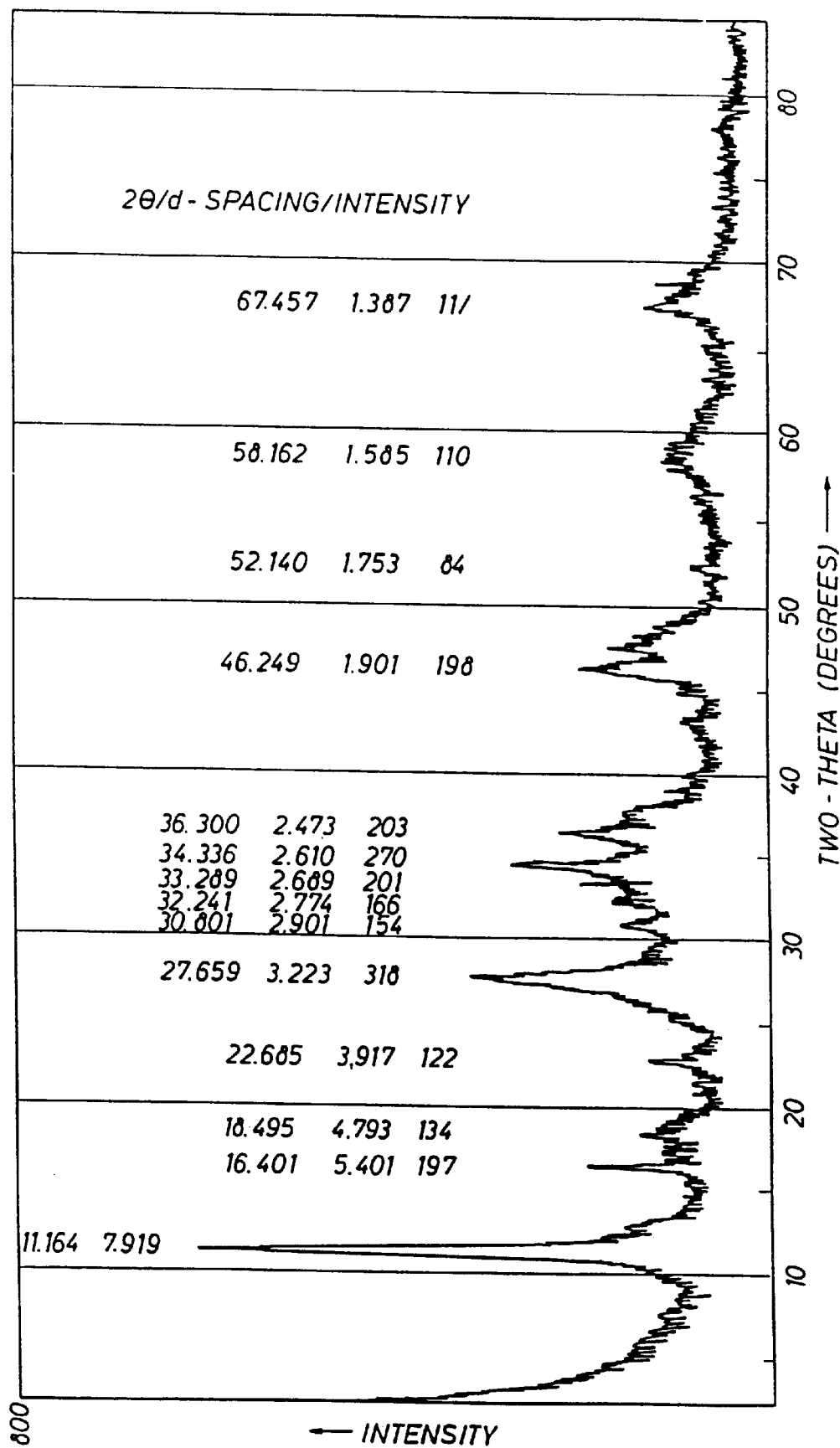
FIG. 9 is an x-ray diffraction pattern for undoped TAM-5.
Figure 10:
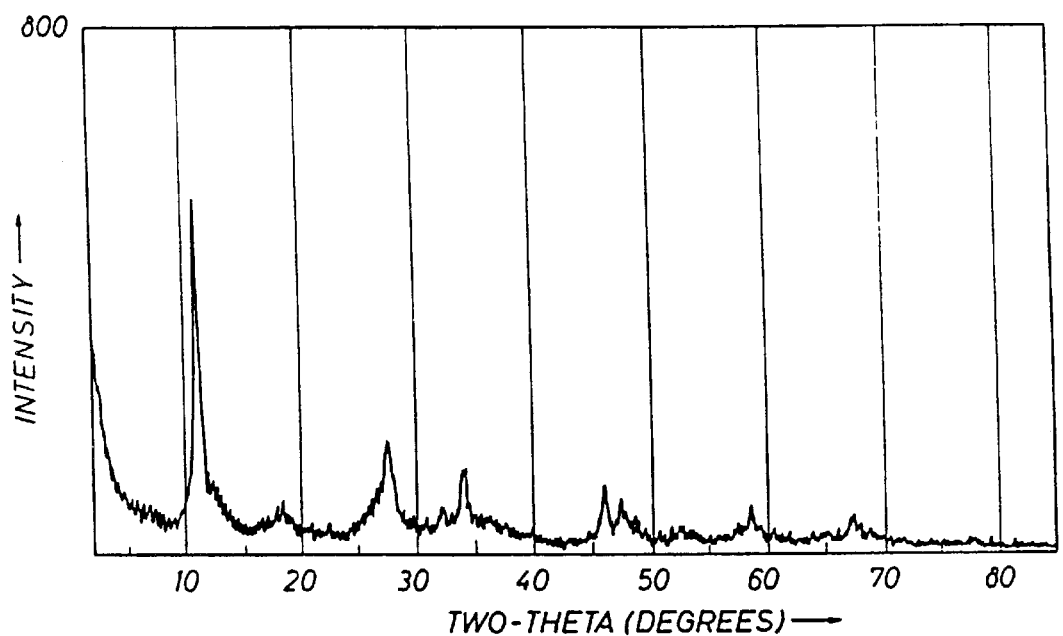
FIG. 10 is an x-ray diffraction pattern for undoped TAM-5 converted to $H^+$ form.
Figure 11:
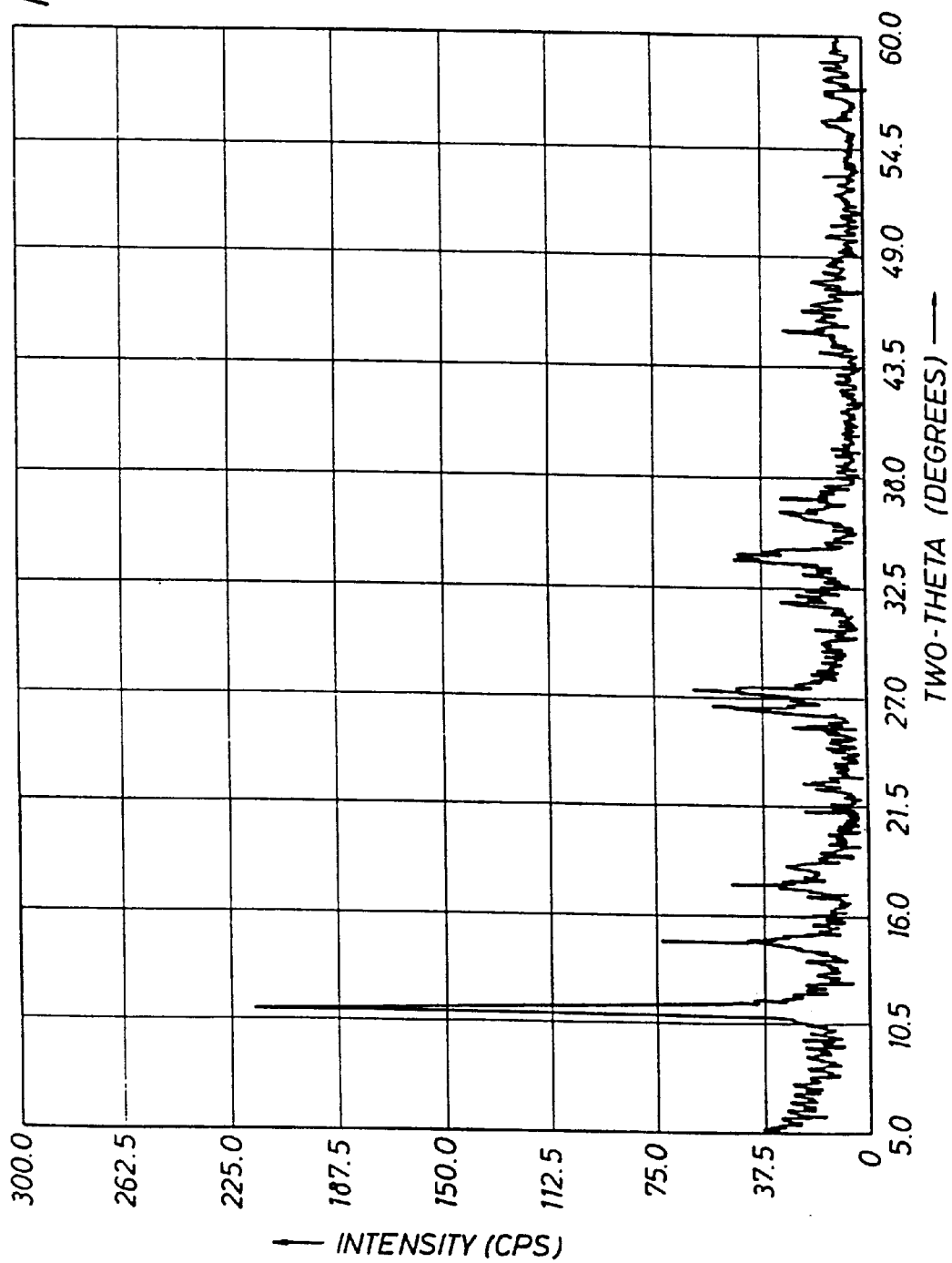
FIG. 11 is an x-ray diffraction of a Nb-doped TAM-5 sample.

FIG. 9 is an x-ray diffraction pattern of an undoped TAM-5 sample; FIG. 10 is an x-ray diffraction pattern of undoped TAM-5 converted to H⁺ form; FIG. 11 is an x-ray diffraction pattern of an Nb-doped TAM-5 sample.

TABLE 9

Composite List of Principal X-Ray Diffraction Pattern Peaks for TAM-5 and Nb-doped TAM-5

| Line No. | 2-theta (degrees) | d-spacing (Angstroms) | Relative Intensities |
| --- | --- | --- | --- |
| 1 | 11.34 | 7.80 | 100 |
| 2 | 14.75 | 6.00 | 24 |
| 3 | 17.64 | 5.02 | 18 |
| 4 | 26.48 | 3.36 | 21 |
| 5 | 27.44 | 3.25 | 27 |
| 6 | 33.90 | 2.64 | 16 |
| 7 | 34.30 | 2.61 | 16 |
| 8 | 36.22 | 2.48 | 11 |

TAM-7

A TEM examination of a TAM-7 composition revealed that it contains a major and minor phase, denoted Phase 1 and Phase 2, respectively. Phase 1 is observed as aggregates of thin flake-like platelets having a layered structure; it appears identical to the major phase in TAM-2. An EDS spectra showed the flakes to contain high Ti and 0 and lesser Na and Si, along with a trace of K not observed in TAM-2.

Phase 2 of TAM-7, by TEM examination, comprises a solid ball structure, frequently connected but sometimes isolated. An EDS spectra of Phase 2 indicated an Si oxide with a small amount of Ti in solution. This phase was observed in TAM-1 and TAM-3 but not in TAM-2.

Figure 12:
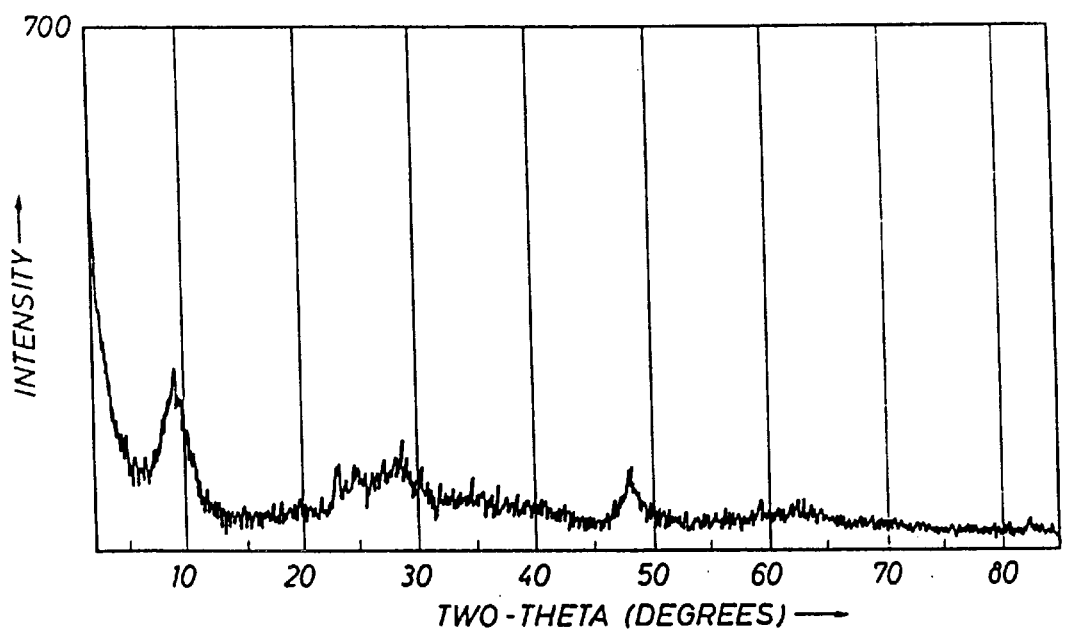
FIG. 12 is an x-ray diffraction pattern for TAM-7.

FIG. 12 is an x-ray diffraction pattern for TAM-7. Table 10 lists 2-theta, d-spacing and relative intensities of the pattern.

TABLE 10

Composite List of Principal X-Ray Diffraction Pattern Peaks for TAM-7

| Line No. | 2-theta (degrees) | d-spacing (Angstroms) | Relative Intensities |
| --- | --- | --- | --- |
| 1 | 9.3 | 9.42 | 100 |
| 2 | 23.4 | 3.8 | 76 |
| 3 | 25.4 | 3.5 | 62 |
| 4 | 28.7 | 3.1 | 74 |
| 6 | 48.4 | 1.88 | 78 |
| 7 | 63.4 | 1.46 | 47 |
| 8 | 82.5 | 1.168 | 27 |

TAM-8

Figure 19:
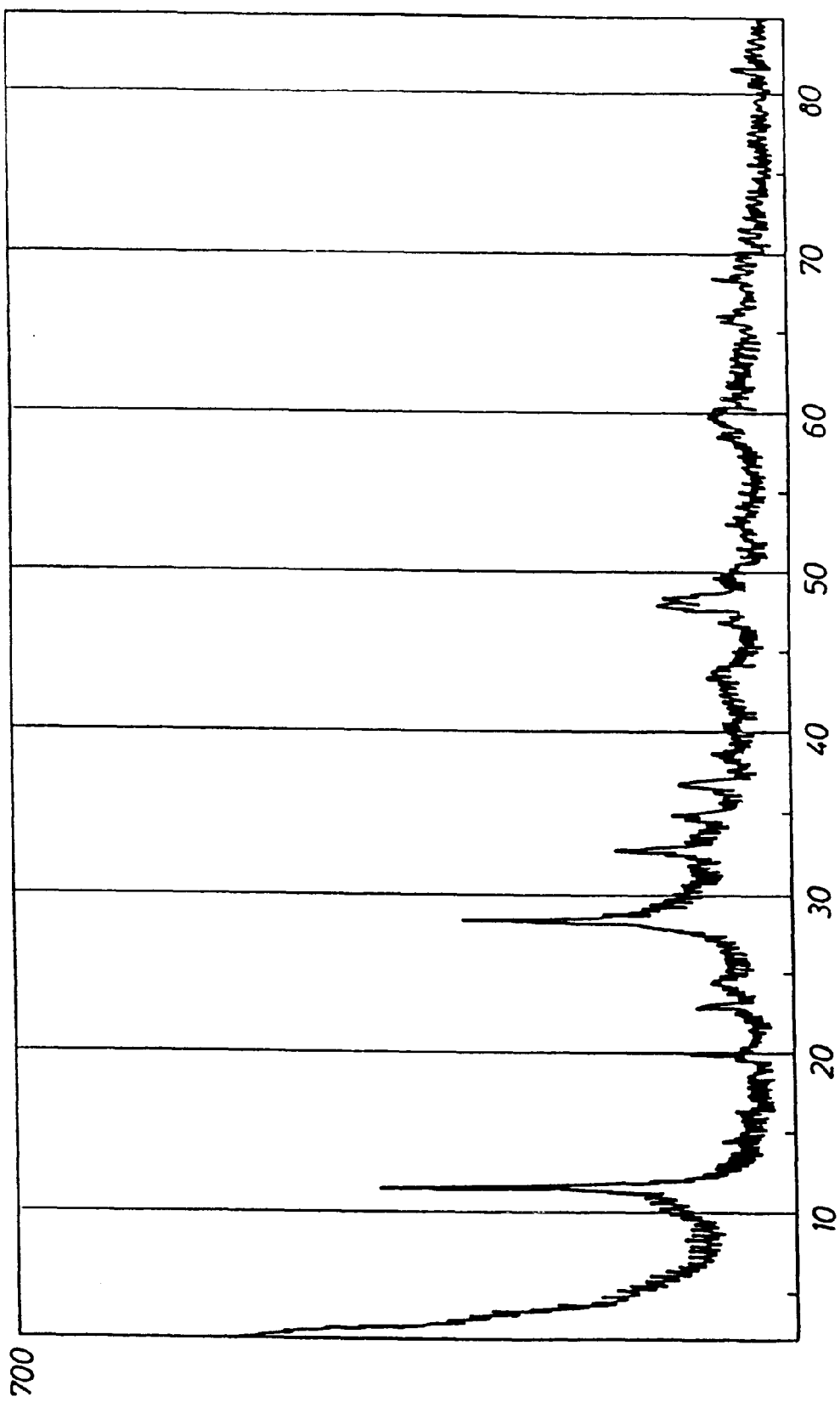
FIG. 19 is an x-ray diffraction pattern of TAM-8.

FIG. 19 is an x-ray diffraction pattern for TAM-8. Table 10b lists 2-theta, d-spacing and relative intensities of the pattern.

TABLE 10b

Composite List of Principal X-Ray Diffraction Pattern Peaks for TAM-8

| Line No. | 2-theta (degrees) | d-spacing (Angstroms) | Relative Intensities |
| --- | --- | --- | --- |
| 1 | 11.5 | 7.70 | 100 |
| 2 | 20.0 | 4.43 | 15 |
| 3 | 21.2 | 4.17 | 10 |
| 4 | 28.5 | 3.11 | 80 |
| 6 | 33.0 | 2.68 | 35 |
| 7 | 35.0 | 2.53 | 20 |
| 8 | 37.0 | 2.39 | 20 |
| 9 | 48.0 | 1.84 | 20 |
| 10 | 60.0 | 1.48 | 10 |

Surface Area and Pore Distribution

The TAM compositions herein disclosed are further characterized by their surface area and pore size distribution relative to other known compositions. The nitrogen BET (Brauneauer-Emmett-Teller) method of measuring surface area is a well accepted technique for use with solids with surface areas greater than about 10 m$^2$/gram. Pore sizes and distributions are a less rigorous parameter for materials characterization. Nevertheless, when both surface area measurement, average pore size and pore size distribution parameters are taken together, definite trends can be established.

The following Table 11 compares a TAM-5 composition with various clays (typically layered "two-dimensional" crystallographic structures) and zeolites (typically "three-dimensional" crystallographic structures). The data clearly shows that TAM-5 has a BET surface area higher than typical clays but significantly lower than zeolites. The zeolites are further characterized by having a large fraction of surface area characterized by micropores, while TAM-5 has little microporosity. Further, TAM-5 has a much larger total pore volume than either the clays or the zeolites.

TABLE 11

SURFACE AREA AND POSRE DISTRIBUTION DATA FOR A TAM-5 MATERIAL AND SOME TYPICAL CLAYS AND SYNTHETIC ZEOLITES

|  | BET SA, m$^2$/g$^{(1)}$ (1) | Mesopore SA, m$^2$/g$^{(2)}$ (2) | Micro SA, m$^2$/g$^{(3)}$ (3) | Total Pore Volume, cc/g | Average Mesopore Diam., Å |
|---|---|---|---|---|---|
| SML TAM-5 #70 | 133 | 130 | 3 | 0.86 | 252 |
| CLAYS |  |  |  |  |  |
| Kaolinite-KGA | 21 | 21 | 0 | 0.27 | 522 |
| Bentonite-SA3-1 | 72 | 41 | 31 | 0.16 | 92 |
| Gentonite-STX-1 | 68 | 68 | 0 | 0.23 | 133 |
| ZEOLITES |  |  |  |  |  |
| ZSM-5 | 316 | 55 | 261 | 0.23 | 30 |
| HY | 427 | 65 | 362 | 0.34 | 32 |
| Silicate | 352 | 51 | 301 | 0.23 | 26 |

$^{(1)}$Total BET surface area
$^{(2)}$Surface areas of mesopores defined here as pores with diameters in the range of about 20–600 Å.
$^{(3)}$Surface area of micropores defined here as pores with diameters less than 20 Å.

Composition of TAM Silicon Titanates

Tables 12 and 13 are results of analyses of TAM-1, TAM-2, TAM-3, TAM-5, Nb-doped TAM-5 and TAM-7. While photomicrographs clearly show multiple phases in TAM-1, TAM-2, TAM-3 and TAM-7, quantitative determination of the compositions and amounts of the active phases of these compositions is not possible. The property of interest of the active phases is the molecular structure of such phases or their performance as a catalyst support or heavy metal absorber. For example, the active phase in a series of TAM-1 samples could have exactly the same composition, while the overall composition of each TAM-1 sample could vary considerably. Therefore, denoting the particular TAM composition in terms of mole ratios of reactants is the preferred nomenclature for the composition inasmuch as it affords reliable reproduction capability. Expressing the TAM compositions in weight percent is of little value inasmuch as the water content varies considerably due to the washing and drying processes, as well as the hygroscopic nature of the compositions. Alkali metal content also varies dependent upon the washing and drying processes. In catalysis and Cs adsorption/ion exchange uses, for example, TAM-5 is equally effective even if all alkali metal is removed prior to use.

TAM-5 and Nb-doped TAM-5 each essentially contain only a single phase; therefore, such phase is the "active" phase.

TABLE 12

Elemental Analyses of TAM materials

|  | Na, wt % | K, wt % | Si, wt % | Nb, wt % | Ti, wt % | H$_2$O, wt % |
|---|---|---|---|---|---|---|
| TAM-1 | 6.1 | NA | 13.8 | NA | 20.8 | ND |
| TAM-2 | 5.9 | NA | 15.7 | NA | 28.3 | ND |
| TAM-3 | NA | NA | 13.8 | NA | 21.5 | ND |
| TAM-5 (A) | 9.9 | NA | 10.9 | NA | 25.7 | 20.7 |
| (B) | 9.7 | NA | 11.2 | NA | 26.4 | 18.8 |
| (C) | 10.4 | NA | 10.5 | NA | 23.8 | 23.0 |
| Nb-Doped TAM-5 |  |  |  |  |  |  |
| (A) | ND | NA | 8.9 | 4.9 | 19.2 | ND |
| (B) | ND | NA | 8.0 | 13.9 | 15.6 | ND |
| (C) | ND | NA | 7.9 | 21.8 | 9.6 | ND |
| TAM-7 | 4.54 | NA | 6.61 | NA | 35.6 | ND |
| TAM-8 | NA | 4.12 | 5.3 | NA | 38.8 | ND |

NA = not added
ND = not determined

TABLE 13

Mole Ratios in TAM Materials

|  | Na: | K: | Si: | Nb: | Ti: |
|---|---|---|---|---|---|
| TAM-1 | 0.60 | 0 | 1.13 | 0 | 1.0 |
| TAM-2 | 0.44 | 0 | 1.00 | 0 | 1.0 |
| TAM-3 | 0 | 0 | 1.09 | 0 | 1.0 |
| TAM-5 | 0.80 | 0 | 0.72 | 0 | 1.0 |
|  | 0.76 | 0 | 0.72 | 0 | 1.0 |
|  | 0.91 | 0 | 0.75 | 0 | 1.0 |
| Nb-DOPED TAM-5 |  |  |  |  |  |
|  | ND | 0 | 0.79 | 0.13 | 1.0 |
|  | ND | 0 | 0.87 | 0.46 | 1.0 |
|  | ND | 0 | 1.41 | 1.17 | 1.0 |
| TAM-7 | 0.27 | 0 | 0.22 | 0 | 1.0 |
| TAM-8 | 0 | 0.13 | 0.24 | 0 | 1.0 |

ND = not determined

Cs, Pu, and Sr Adsorption

As noted above, the TAM crystalline titanates have been found to be very efficient in removing radioisotopes of Cs, Sr and Pu from radioactive or defense waste. Removal of such radioactive matter is extremely important as it would allow such defense waste to be stored as a dry chemical rather than as a liquid radioactive waste requiring isolation for safety. Ion exchange materials which can differentiate and separate radioactive ions by virtue of ionic size rather than charge would provide a more efficient separation vehicle. The TAM compositions provide such ionic separation of Cs from Na by virtue of size selectivity.

Of the TAM compositions, TAM-5 is superior for removing the radioactive isotope of Cs from Na. TAM-5 compositions having a $k_d$ of 4900, for example, separates one atom of Cs for every 2×10$^5$ atoms of Na. As a basis for comparison a $k_d$ of 84 has been reported for a commercial organic ion-exchange resin.

Further, development of TAM-5 compositions comprising a sample size of 33 (discussed in the following paragraph) has yielded an average $k_d$ of 58 with a standard deviation of ±15. The simulated radioactive waste composition comprised 5.7M Na$^+$–0.6M OH$^-$ and 100 ppm Cs. The $k_d$ values of all compositions tested were within two standard deviations.

As disclosed earlier, the initial "baseline" reactant compositions for TAM-5 have the following stoichiometry in mole ratios: $H_2O:OH^-$ (Na):Si:Ti=165:2.46:1.13:1. The initial "baseline" preparations included heating at 170° C. for 120 hours; the $H_2O$:Ti,$OH^-$:Ti and Si:Ti mole ratios were varied in the ranges of 30–165, 2.0–3.0, and 0.8–1.5, respectively. The temperature range was 140–230° C., the reaction time range was 24–192 hours, and batch sizes ranged from 1 gram to 200 grams. The initial "baseline" sources of Ti, Si and $OH^-$ were tetraisopropyl titanate (TIPT), tetraethyl orthosilicate (TEOS) and sodium hydroxide (NaOH), respectively. Less expensive silicon dioxide or Ludox colloidal silica could be substituted for TEOS, and hydrous oxides of Ti and Si could also be used.

Figure 13:
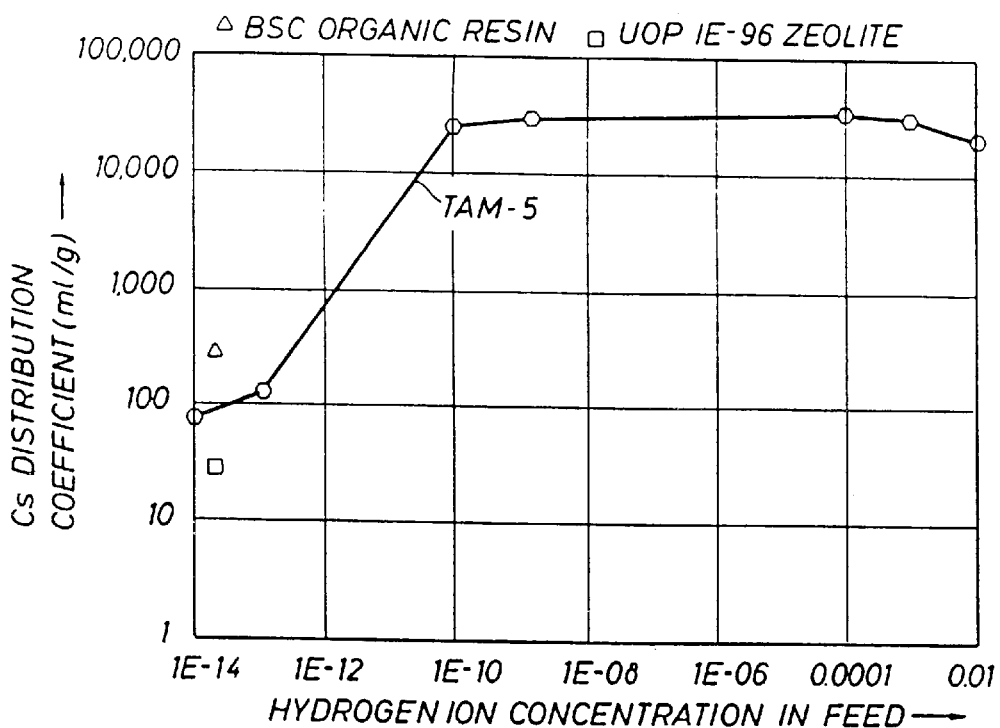
FIG. 13 shows variation of Cs selectively of TAM-5 with pH.

Cs selectivity of TAM-5 is drastically affected by pH, as shown in FIG. 13, where Cs $k_d$ values decrease significantly with increasing pH. Also shown are Cs $k_d$ values using the inorganic zeolite UOP IE-96 and BSC organic resin. At a pH value of less than 12, TAM-5 is clearly several orders of magnitude more effective than either the zeolite or the resin. At pH values of greater than 12, TAM-5 is about twice as effective as the zeolite but not as effective as the resin.

Figure 15:
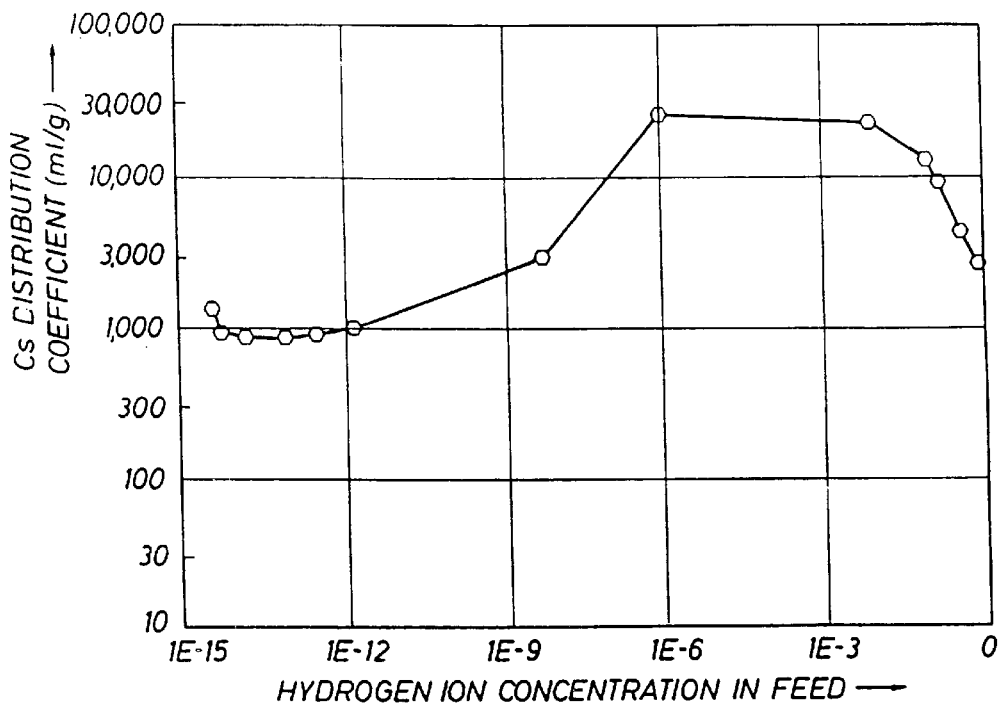
FIG. 15 shows the variation of Cs selectivity of Nb-doped TAM-5 with pH.

Also, as earlier disclosed, it was noted that Nb added as pentaethyl niobate (PEN) and niobium oxide to TAM-S dramatically increased Cs selectivity. FIG. 15 shows the Cs selectivity of Nb-doped TAM-5 over a range of pH values. In particular Cs selectivity at high pH was greatly improved.

Figure 14:
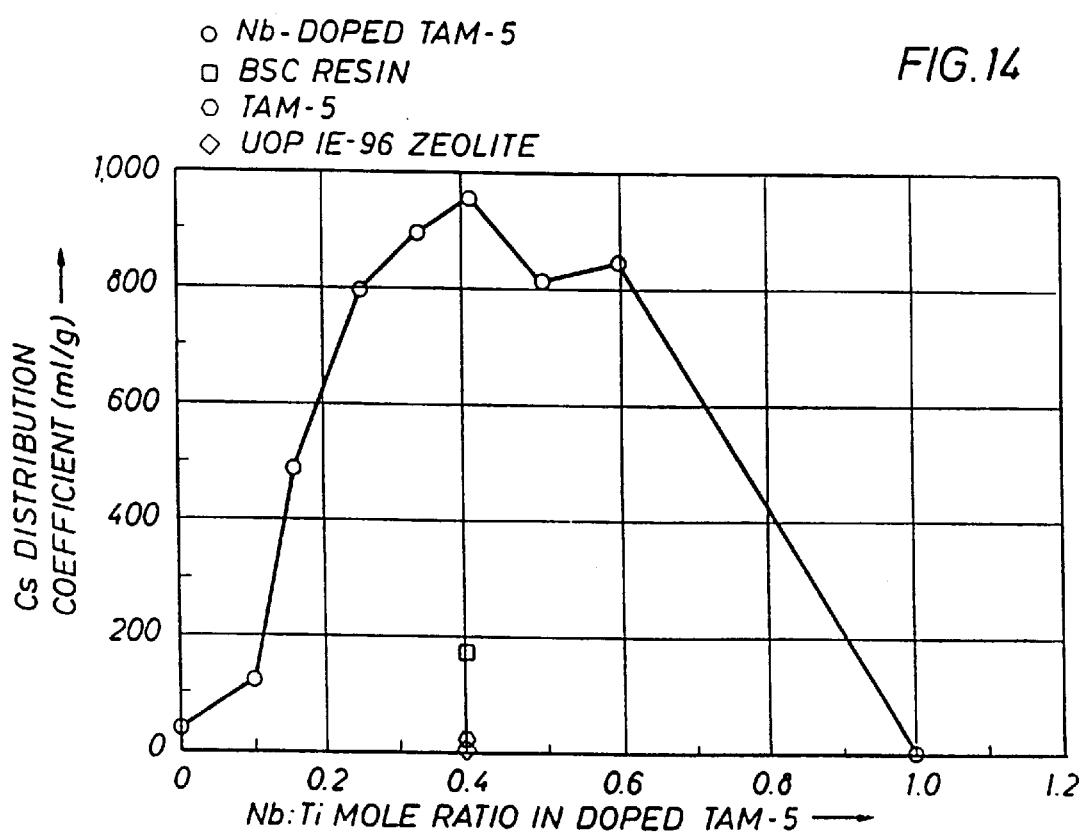
FIG. 14 shows Nb-doped TAM-5 Cs selectivity.

As shown in FIG. 14, the Cs distribution coefficient depends on the mole ratio of Nb:Ti in the reactants. Results for the zeolite and BSC resin are also included in FIG. 14.

As disclosed earlier, it is believed Nb substitutes into the TAM-5 structure causing small changes in structure. Nb in excess of that which goes into the TAM-5 structure further comprises two Nb-rich phases, neither of which is believed to absorb Cs in a high Na matrix. The high Cs selectivity of Nb-doped TAM-5 in a strongly basic solutions with high Na content makes these Nb-doped TAM-5 compositions unique.

Figure 16:
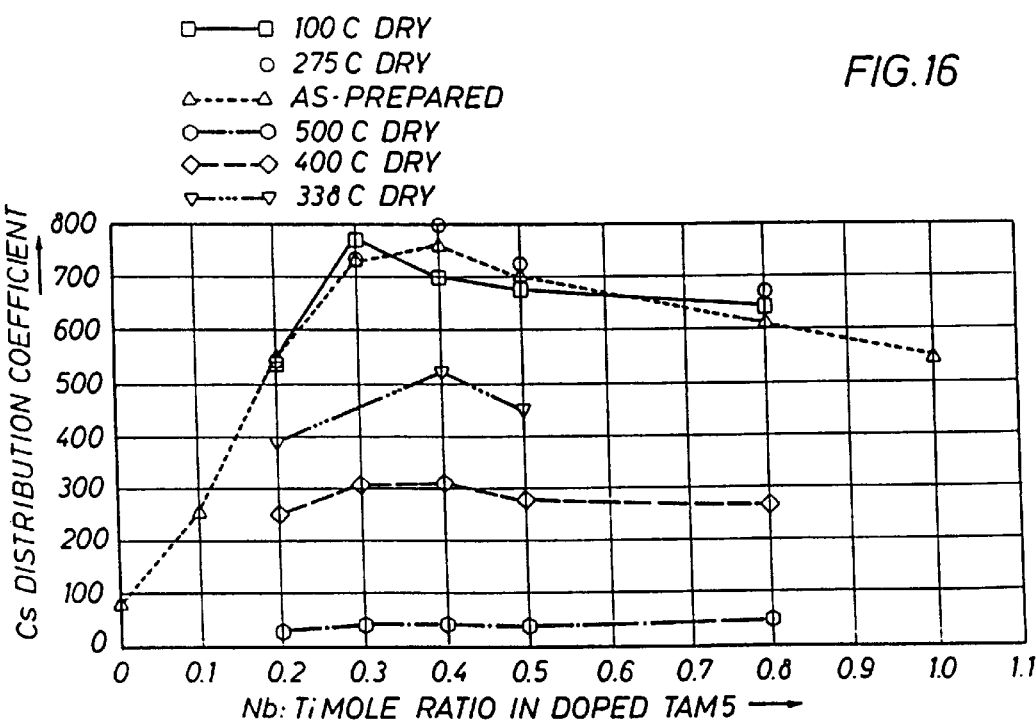
FIG. 16 shows the effect of temperature on Cs selectivity of Nb-doped TAM-5.

The presence of Nb dopant also "stabilizes" the TAM-5 structure at high temperatures. For example, an undoped TAM-5 sample composition with a Cs $K_d$ of 72 in a 5.7M Na–0.6M $OH^-$ stimulant composition was heated at 100° C. and 275° C., resulting in the Cs $k_d$ dropping to 58 and 22, respectively. In contrast thereto, FIG. 16 reveals the much higher Cs $k_d$ values attained using Nb-doped TAM-5. Temperatures up to 275° C. have little effect on Cs selectivity. Higher temperature result in decreased $k_d$ values; nevertheless, the $k_d$ values of Nb-doped TAM-5 are still higher than the UOP zeolite. Temperature stability is important not only with regard to Cs selectivity but in catalyst support use and in processes to convert TAM powders to extrudates, pellets, spheres and the like.

Figure 17:
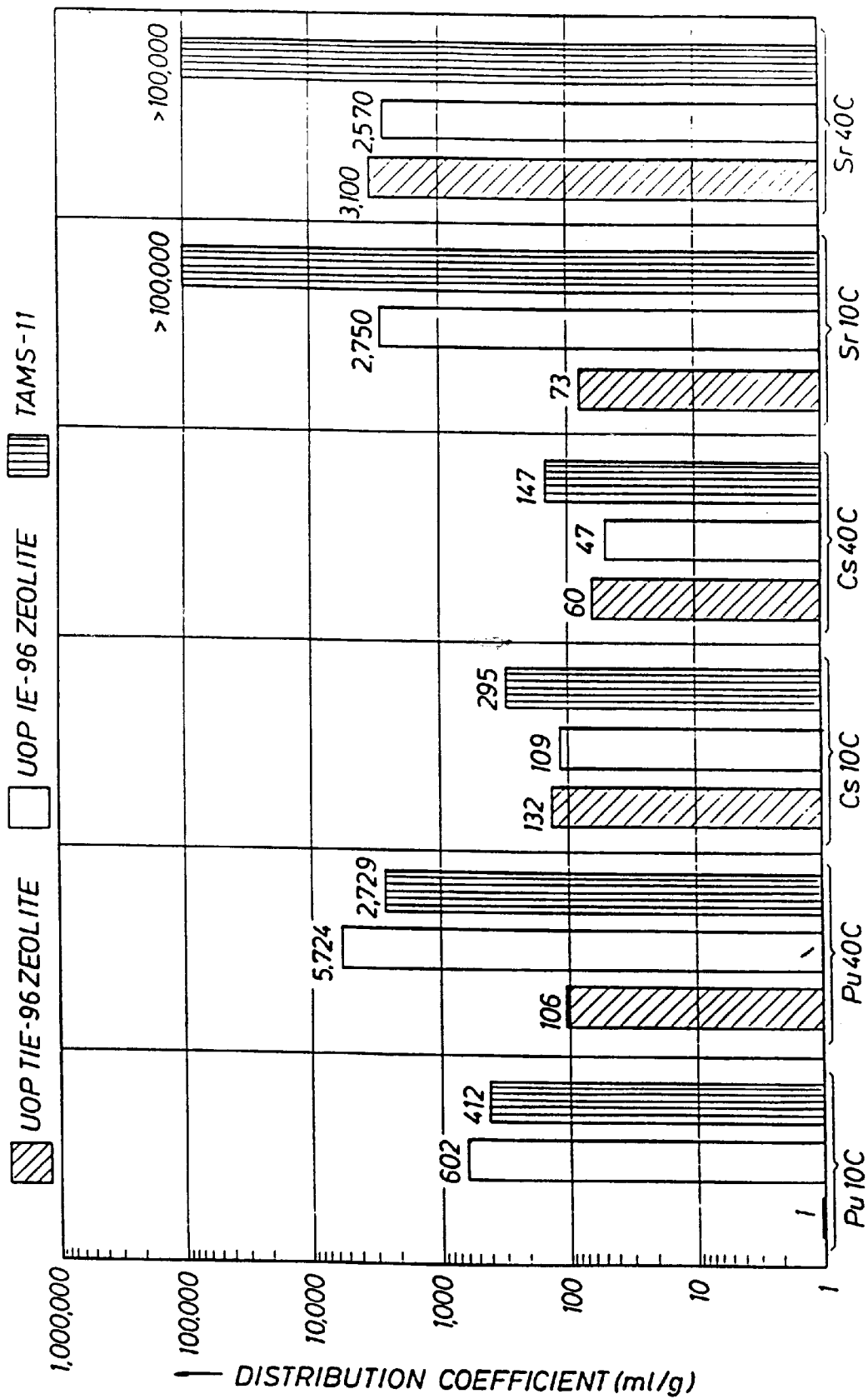
FIGS. 17 and 18 compare the effectiveness of TAM-5 in removing Cs, Pu and Sr from two defense waste compositions.
Figure 18:
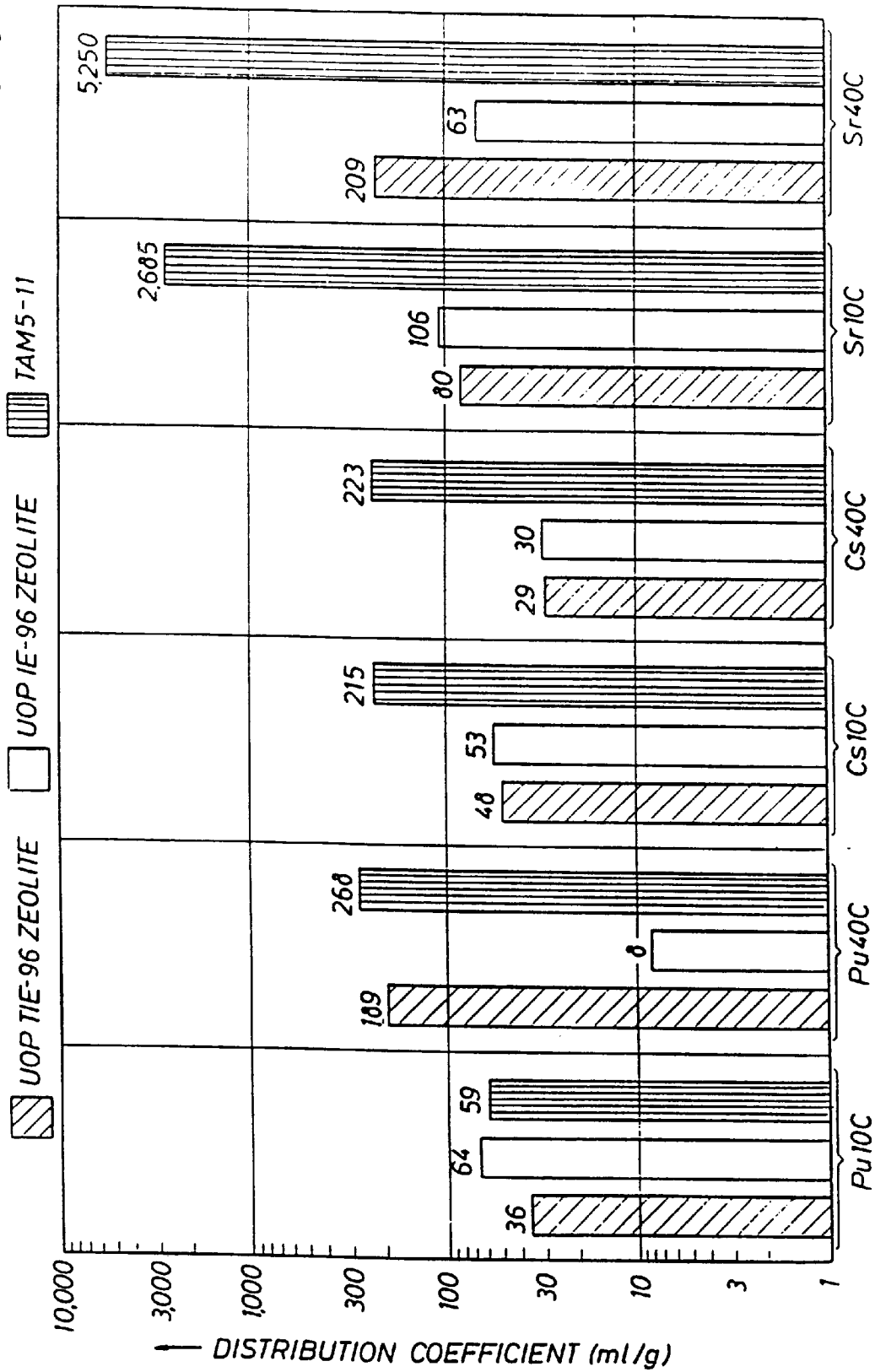

FIGS. 17 and 18 reveal the effectiveness of TAM-5 in removing Pu, Cs and Sr from two synthetic defense waste compositions, respectively. The results show that TAM-5 is comparable to or better than the zeolites (UOP TIE-96 zeolite and the IE-96 zeolite modified by Ti addition) under most conditions for removing Pu, better than the zeolite under all conditions with respect to Cs selectivity, and far better under all conditions with respect to Sr selectivity. The Nb-doped TAM-5 yields Sr selectivity comparable to the TAM-5 with no niobium. For example, under equilibrium pH>12, the Nb-doped Se $K_d$ is approximately 10,000 mL/g.

TAM compositions can be prepared from a wide variety of Si and Ti reactants. Some dopants have been identified to have positive effects on selectivity of TAM compositions. Nb-doped TAM has been prepared using Nb, Ti, Si-containing hydrous metal oxides and sodium metasilicate as reactants and by substituting hydrated niobia ($Nb_2O_5$) for PEN in the initial baseline method. Nb-doped TAM-5 with high Cs selectivity has been prepared in a period of 60 minutes under hydrothermal conditions at 200° C. Small amounts of Nb-doped TAM-5 form at 92° C. which would be a less expensive preparation than under hydrothermal conditions.

Further samples of TAM-5 and TAM-5 modified with niobium were synthesized for the purpose of performing detailed chemical and physical characterizations. The characterization data were used to support determination of the structure, identify differences in performance for radionuclide separations for different TAM-5 compositions, and to differentiate the TAM-5 materials from other silicotitanate structures. The samples and their preparation parameters are described in Table VIII:10–19, as follows (the molecular ratios are for the charged reactants and not the composition of the final product):

TABLE VIII

10–19

| EXAMPLE | REACTOR SIZE (GAL) | $H_2O$/Ti | NaOH/Ti | Si/Ti | Nb/Ti | Time (hr) | Temp (° C.) | XRD $a_0$, Å | SRD $c_0$, Å |
|---|---|---|---|---|---|---|---|---|---|
| 10 | 1 | 165 | 2.46 | 1.13 | 0 | 2 | 230 | 7.787 | 12.00 |
| 11 | 1 | 164 | 2.46 | 1.13 | 0.10 | 2 | 230 | 7.800 | 11.997 |
| 12 | 1 | 165 | 2.46 | 1.13 | 0.16 | 2 | 230 | 7.814 | 12.016 |
| 13 | 1 | 165 | 2.46 | 1.13 | 0.25 | 120 | 200 | 7.869 | 11.969 |
| 14 | 1 | 165 | 2.46 | 1.13 | 0.33 | 2 | 230 | 7.846 | 12.044 |
| 15 | 1 | 165 | 2.46 | 1.13 | 0.40 | 2 | 230 | 7.850 | 12.050 |
| 16 | 5 | 165 | 2.46 | 1.13 | 0.40 | 2 | 230 | 7.846 | 12.043 |
| 17 | 1 | 165 | 2.46 | 1.13 | 0.50 | 2 | 230 | 7.846 | 12.050 |
| 18 | 1 | 165 | 2.46 | 1.13 | 0.60 | 2 | 230 | 7.847 | 12.050 |
| 19 | 1 | 165 | 2.46 | 1.13 | 1.00 | 2 | 230 | ND | ND |

ND-not determined, material is not crystalline

With the exceptions as noted in Table VIII:10–19 all samples, Examples 10–19, were made in accordance with the procedure as described in Example IV:2 as earlier described.

Examples VIII:10–19 were subjected to elemental analysis with the ratio of elements as set forth in Table IX:10–19 below.

TABLE IX

10–19

| EXAMPLE | Na | Si | Ti | Nb |
|---|---|---|---|---|
| 10 | 0.87 | 0.57 | 1.0 | 0.0 |
| 11 | 1.03 | 0.67 | 1.0 | 0.11 |
| 12 | 1.03 | 0.67 | 1.0 | 0.17 |
| 13 | 1.02 | 0.69 | 1.0 | 0.24 |
| 14 | 1.09 | 0.67 | 1.0 | 0.35 |
| 15 | 1.10 | 0.83 | 1.0 | 0.38 |
| 16 | 1.09 | 0.69 | 1.0 | 0.42 |
| 17 | 1.18 | 0.68 | 1.0 | 0.51 |
| 18 | 1.27 | 0.69 | 1.0 | 0.62 |
| 19 | 1.65 | 0.86 | 1.0 | 1.04 |

Initial powder x-ray diffraction data on a Nb-doped/TAM-5 material like that of example 13 of Tables VIII and IX indicated that the crystalline material had approximate lattice constants of 7×7×12 Å, and further TEM results indicated that the material was tetragonal. The complete structure determination process for this Nb-doped TAM-5 material involved room temperature (25° C.) x-ray diffraction, between 2θ=15–80°, with a step size of 0.02° for a total of 3500 data points. The crystal structure of this material was established by the x-ray Rietveld refinement, using the starting model of a naturally occurring titanosilicate crystal in the tetragonal space group of P4$_2$/mcm (Sokolova, E.V., Rastsvetaeva, R.K., Andrianov, V.I., Egorov-Tismenko, Yu. K., Men'shikov, Yu. P. Sov. Phys. Dokl. 1989, 34(7), 114.)

As with the model material, a Nb-doped TAM-5 material like that of example 15 of Tables VII and IX is a molecular sieve with titanium (and a percentage of niobium in disordered sites substituted for Ti) and silicon atoms as the framework atoms separated by bonding oxygen atoms. The resultant framework is negatively charged with an approximated empirical formula of $(Si_2NbTi_3O14)^{-3}$. One of the framework oxygen atoms is considered part of a hydroxide group (—OH) and is therefore an extra negative charge. The Ti/Nb atoms are octahedrally (six coordinate) bound to oxygen atoms, while the Si atoms are tetrahedrally (four coordinate) bound to oxygen atoms. Four Ti atoms are edge-bonded to each other, forming a cubic cluster in the "corners" of the cages (in the ab-plane); these cluster also form chains in the c-direction. In the ab-plane, the octahedra of the cluster chains are corner bonded to the Si tetrahedra through oxygen atom O (4) with a normal Si—O bond length of 1.657 (2) Å. There are four "cylinderical" cages formed per unit cell of this molecular sieve.

The non-framework components of this Nb-doped TAM-5 material (example 15) include water molecules and charge balancing cations. The water molecules are not charged but do occupy space in the sieve cage. The cations (with positive charges) have three sites, two in the cage and one in the walls, (above the silicon atom). These cations are responsible for charge balancing the framework.

All Example VIII samples, except examples 12 and 17, were examined by a transmission electron microscope (TEM) and the results observed are given in Table X:10–19, below.

TABLE X

10–19

| Example | Tetragonal Na—Ti-silicate "cuboids" | (Nb, Ti)-oxide "rods" | (Nb, Ti)-silicate "platelets" | Other Phases | Estimated Mean Particle Size of Tetragonal Na—Ti-silicate crystals (μm) | Estimated Volume Fraction |
|---|---|---|---|---|---|---|
| 10 | 100% | — | — | — | 0.02 | 1.0 |
| 11 | 100% | — | — | — | 0.02 | 1.0 |
| 13 | >98% | <1% | <1% | Ti oxide lenticular particles <<1% Si—O—Ti—Nb platelets <<1% | 0.02; 0.15* | 0.98 |
| 14 | >98% | 1–2% | <1% | — | 0.2 | 0.98 |
| 15 | >98% | ~1% | <1% | — | 0.2 | 0.98 |
| 16 | ~95% | ~5% | — | — | 0.2 | 0.95 |
| 18 | ~85% | 10–15% | ~2% | Si—O—Ti—Nb: 1% | 0.4–0.5 | 0.85 |
| 19 | 2–3% | 20–25% | 20–25% | Ti—Nb-silicate + Na amorphous: 50–60% Si—Ti—Nb—Na—O: <1% Na—Nb-silicate + Ti: <1% | 0.35 | 0.025 |

*Represents a bimodal distribution of crystal sizes

BET surface area, pore volume, and pore diameter measurements were conducted on examples 10–19 using a Quantachrome corporation Autosorb 5 Gas Sorption System. Quantachrome Corporation is located in Syosset, N.Y.

Surface area was determined by the multi-point Brunauer-Emmett-Teller (BET) procedure. Total pore volume and pore diameter was derived from the amount of vapor absorbed at a relative pressure close to unity, assuming that the pores are filled with liquid adsorbate. The results obtained are given in Table XI:10–19, below.

TABLE XI

| | 10-19 | | |
|---|---|---|---|
| Example | Surface Area (m²/g) | Pore Volume (cm³/g) | Pore Diameter (Å) |
| 10 | 111.7 | 0.932 | 333.5 |
| 11 | 65.7 | 0.587 | 357.7 |
| 12 | 38.3 | 0.431 | 450.1 |
| 13 | 29.4 | 0.341 | 414.8 |
| 14 | 31.5 | 0.265 | 336.4 |
| 15 | 39.0 | 0.253 | 260.1 |
| 16 | 30.5 | 0.236 | 309.3 |
| 17 | 34.8 | 0.167 | 192.1 |
| 18 | 36.2 | 0.252 | 279.3 |
| 19 | 80.7 | 0.572 | 283.4 |

Thermogravimetric analyses (TGA) of crystalline silicotitanates of examples 10–19 were conducted using a TA Instruments Model 2000 controller coupled to a Model TA 951 Thermogravimetric Analyzer (TGA) module. TA Instruments, Inc. is located in New Castle, Del. Differential scanning calorimetry (DSC) measurements of CSTs were conducted on the TAM-5 materials of examples 10–19 using a TA Instruments Model 2000 controller coupled to a Model 910 Pressure Differential Scanning Calorimeter (DSC) Module. The results, expressed as % water loss, are recorded in Table XII:10–19 below.

Transition onset temperature (C), heat of transition (Joules/gram), and transition temperature as the exotherm was calculated for each sample, with the results are reported in Table XII:10–19 below.

TABLE XII

| | 10-19 | | | |
|---|---|---|---|---|
| Example | Transition Onset Temperature (° C.) (DSC) | Heat of Transition (Joules/gm) (DSC) | Transition Temperature (° C.) (Exotherm) (DCS) | % Water Loss (TGA) |
| 10 | 206.2 | 56.8 | 226.7 | 4.865 |
| 11 | 197.4 | 98.9 | 225.9 | 5.359 |
| 12 | 205.0 | 83.0 | 229.7 | 5.490 |
| 13 | 208.5 | 84.0 | 237.8 | 6.008 |
| 14 | 206.8 | 89.5 | 226.2 | 5.860 |
| 15 | 202.8 | 81.3 | 228.7 | 5.926 |
| 16 | 210.3 | 81.7 | 231.6 | 5.287 |
| 17 | 204.7 | 95.0 | 231.0 | 5.450 |
| 18 | 202.5 | 72.6 | 226.5 | 5.389 |
| 19 | 195.7 | 36.8 | 244.0 | 3.799 |

Cesium distribution coefficients ($K_d$) values were measured for the crystalline silicotitanate powders TAM-5 and TAM-5 modified with a niobium dopant of example 10–19 and are shown in the following Table XIII:10–19. These cesium ion-exchange experiments were conducted using the following procedure.

One hundred milligrams (mg) of as received crystalline silico-titanate powder was weighted into a 20 milliliter (mL) polyethylene terephthalate (PET) plastic scintillation vial. Ten milliliters of waste simulant was added to the vial. The waste simulant was an aqueous solution containing 5.7 M $NaNO_3$ and 0.6 M NaOH, and a 100 mg/L concentration of cesium chloride solution. The vial was capped, and placed on a wrist action shaker. Samples were agitated for 18–24 hours, removed from the shaker, and the powder material permitted to settle. The supernate was vacuum filtered with 0.2 micron membrane filters. The supernate was then diluted 10:1 prior to cesium analysis by flame atomic absorption spectroscopy. $K_d$'s were calculated using the following formula:

$$K_d(\text{ml/gm}) = \frac{Cs}{Cl}$$

where:

Cs=concentration of cesium on the exchanger $$\left(\frac{\text{g } Cs}{\text{g } solid}\right),$$

and

Cl=concentration of cesium in the liquid $$\left(\frac{\text{g } Cs}{\text{ml } liquid}\right)$$

| Example | Cs $K_d$, ml/g |
|---|---|
| 10 | 40 |
| 11 | 120 |
| 12 | 490 |
| 13 | 790 |
| 14 | 890 |
| 15 | 950 |
| 16 | 1010 |
| 17 | 810 |
| 18 | 840 |
| 19 | 4 |

These newer TAM-5 and Nb-doped TAM-5 materials were studied in solutions of 100 ppm Cs and 5.7 M Na at different pHs (though spanning the range of 2.5 M OH⁻ to 1.0 M H⁺ (for their selectivity performance in terms of cesium distribution coefficiency, $K_d$. The trends observed are illustrated in FIG. 14.

Further, the effect of differing acid concentrations over time on the cesium distribution coefficient of the TAM-5 and Nb-doped TAM-5 materials was studied in nitric acid solutions of molarity between 1 and 6 after 18 hours and 5 days. The cesium distribution coefficient remained essentially steady at a $K_d$ value of 800 over the molarity values and time range studied. The TAM-5 materials were further studied for stablity in a simulated waste solution containing 1.3 M free OH⁻ over a 90 day period. The cesium distribution coefficient observed for the TAM-5 material over such time span remained essentially steady, i.e., within a $K_d$ range of about 140–160. Further, the performance of a TAM-5 material for cesium selectivity was studied and solutions containing various concentrations of potassium compared to cesium and solutions containing various amounts of sodium compared to cesium. In solutions with K/Cs ratios ranging from 100 to over 18,000, the $K_d$ values of TAM-5 materials studied decreased only by a factor of two. In sodium solutions, TAM-5 materials exhibited higher $K_d$ cesium selectivity at sodium concentrations of 0.1 to 10 molar than did CS-100, IE-96 or BIB-DJ absorbance.

Samples of CST TAM-5 materials were tested for cesium ion-exchange capacity. The samples included TAM-5 with Nb/Ti ratios in the range of 0–1. When prepared with repeated washings by 10% acetic acid followed by cesium hydroxide, the cesium capacities ranged from 22–24% Cs by weight. When prepared with repeated washings of cesium chloride, the capacities ranged from 15–21%.

Samples of TAM-5 material were exposed to radiation doses of $10^7$, $10^8$, and $10^9$ rads (Si), corresponding to 7.0, 70.2, and 698 hours of exposure respectively, from a Co-60 source. The test temperature was maintained at 25° C. Samples were tested as follows: dry powders, powders in Hanford Tank 101-AW simulant solution, Cs-loaded material in 101-AW simulant solution, Cs- and Sr-loaded material in 101-AW simulant solution, Cs-loaded material in 2M $HNO_3$, and amorphous hydrous titanium oxide (HTO) material. Multiple samples were tested for each category of tests. The amorphous hydrous titanium oxide material was tested as a control as previous literature data on its radiation stability are available.

Stability was determined by examining the Cs (or Sr) distribution coefficients and the XRD patterns of the materials both before and after exposure to the radiation fields. In comparing the distribution coefficients before and after exposure to the radiation field, the distribution coefficients were within experiment measurement error of the cesium concentration as measured by atomic absorption spectroscopy. Specifically, the distribution coefficients of the TAM-5 dry powders, the TAM-5 materials in the 101-AW simulant, and the samples fully loaded with Cs generally showed less than 5% variation in comparing performance before and after radiation exposure. No significant effect on performance was noted, even after exposure to $10^9$ rads (Si).

TAM Compositions as Catalyst Supports

As disclosed above, certain TAM compositions, as well as CT TP2 (Type 2 CT) disclosed in application Ser. No. 07/751,003, filed Aug. 28, 1991, comprise excellent precursors and supports for sulfided catalysts (e.g. Ni—Mo). Such catalysts are used in the hydrogenation of organic components (e.g. heavy crude oils), direct liquefaction of coal, and hydrodesulfurization (HDS) of organic components (e.g. heavy crude oils).

Preparations of these catalyst supports initially involve preparation of TAM-1 by any of the many methods disclosed herein; Type 2 CT is prepared as disclosed in U.S. Pat. No. 5,177,045. TAM-1 and Type 2 CT are first ion exchanged with sulfuric acid to remove the sodium cation, removed from solutions by filtration and washed with acetone. The compositions are then reslurried in an aqueous solution containing the desired amount of ammonium heptamolybdate and the pH is adjusted to 4 by addition of sulfuric acid. The slurry is then filtered and rinsed with acetone and either reslurried in deionized distilled water or partially dried. If reslurried, the pH is adjusted to 6 by addition of ammonium hydroxide; nickel nitrate is then added. The pH is maintained at 6 by addition of acid or ammonium hydroxide. The slurry is filtered and rinsed with acetone. If not reslurried, nickel nitrate is loaded onto the catalyst by the incipient wetness technique.

The catalysts are then dried for up to 12 hours at 65° C. in a vacuum oven. After drying, the catalysts are sulfided with hydrogen sulfide at 425° C. Alternatively, the catalysts may be calcined at 500° C. for 4 hours prior to sulfiding.

For testing purposes, 10 mg of the prepared catalysts (i.e. sulfided Ni—Mo TAM-1, and Type 2 CT) were sized to less than 100 mesh, slurried in 1 gram of hexadecane and 100 mg of pryrene, and placed in a batch reactor. The reactor was pressured to 1430 psig hydrogen at room temperature. The reactors themselves were then placed in a container and maintained at 300° C. for a period of 10 minutes.

Table 14 is a comparison of catalytic activity for hydrogenating pyrene to dihydropyrene using sulfided Ni—Mo supported on Type 2 CT, TAM-1, amd hydrous silicon titanium oxide and hydrous silicon titanium oxide, as well as the commercial catalysts, Shell 324 and Amocat 1C.

TABLE 14

COMPARISON OF CATALYSTS ACTIVITIES FOR HYDROGENATION OF PYRENE (pyr) AND HYDRODESULFURIZATION (HDS) OF DIBENZOTHIOPHENE

| Catalyst | Form | No, %[a] | Ni, %[a] | SA, $m^2/g^c$ | $K_{pyr}^c$ | $K_{pyr}^f$ | $\eta$ | $K_{HCS}^a$ | $K_{KDS}^f$ | BP/CHB |
|---|---|---|---|---|---|---|---|---|---|---|
| Shell 324 | 1/32" Extrud. | 13.2 | 2.7 | 152 | 0.041 | 0.31 | 0.24 | 0.016 | 0.121 | 1/6 |
| Shell 324 | −100 Mesh | 13.2 | 2.7 | 152 | 0.120 | 0.91 | 0.72 | ND | ND | ND |
| Shell 324 | −200 Mesh | 13.2 | 2.7 | 152 | 0.158 | 1.20 | 0.92 | 0.028 | 0.158 | 1.9 |
| Amocat 1C | 1/16" Extrud. | 10.7 | 2.4 | 177 | 0.038 | 0.36 | 0.24 | ND | ND | ND |
| Amocat 1C | −100 Mesh | 10.7 | 2.4 | 177 | 0.059 | 0.55 | 0.38 | ND | ND | ND |
| Amocat 1C | −200 Mesh | 10.7 | 2.4 | 177 | 0.155 | 1.45 | 1.0 | ND | ND | ND |
| NiHO-Type 2 Ct (Batch #50) | −100 Mesh/Sulfided @ 425° C. | 5.35 | 1.76 | 160[e] | 0 × 0.065 | 1.22 | 0.8[d] | ND | ND | ND |
| TAM-1, Si/Ti = 1.1 | −100 Mesh/calcined @ 500° C./sulfided @ 425° C. | 2.85 | 0.97 | 160[e] | 0.027 | 0.94 | ND | 0.0085 | 0.30 | 11.9 |
| TAM-1, Si/Ti = 1.1 | −100 Mesh/sulfided @ 425° C. | 2.85 | 0.97 | 160[e] | 0.024 | 0.83 | ND | 0.0073 | 0.26 | 3.16 |
| yyNiMe—$Na_{0.3}Ti$[b] | −100 Mesh | 11.2 | 3.7 | 130 | 0.186 | 1.66 | ND | 0.0302 | 0.0302 | 2.8 |
| NiMo—$Na_{0.3}TiSi_{0.25}$[b] | −100 Mesh | 8.7 | 3.0 | 166 | 0.268 | 3.08 | ND | 0.0132 | 0.985 | 2.8 |

[a]Composition and surface areas of as-received Amocat 1C and Shell 324. Composition of HTO and CT-based Catalysts after calcination @ 500° C.
[b]These are the latest and best of the HTO-Based NiHO Catalysts.
[c]Prior to ion exchange and after degassing at 150° C. for 12 hous.
$\eta$ = Effectiveness Factor; Effective Diffusivities based on pyrene for Shell 324 and Amocat 1C are $6.5(10)^{-12}$ and $3.2(10)^{-11}$ $m^2/n$. The efectiveness factors were calculated assuming a pseudo first order rate equation and spherical particles.
[d]Calculated based on an estimate of the effective diffusivity of pyrene.
ND = not determined.
BP/CHB = Moles of biphenyl divided by the moles of cyclohexyl benzene. A high ratio indicates efficient utilization of hydrogen.
[e]Rate constant with units of $sec^{-1}$. gram catalyst$^{-1}$.
[f]/rate constant with units of $sec^{-1}$. gram No$^{-1}$.

The data illustrate that sulfided Ni—Mo supported on Type 2 CT, and TAM-1 have comparable activity on an active metal basis as the commercial catalysts and the Ni—Mo—Na$_{0.5}$Ti amorphous catalyst, but the sulfided Ni—Mo Na$_{0.5}$TiSi$_{0.25}$ amorphous catalyst has a much higher activity. For the amorphous Ti catalysts and Type 2 CT the majority (>98%) of the sodium was removed prior to loading Mo and Ni by using 0.1N HCl. TAM-1 had a sodium level of 2.27% prior to the loading even though H$^+$/Na$^+$ ion exchange had been performed. Initial sodium levels of TAM-1 varied from 8% to 12%. Aqueous mixtures of approximately 10% solids were used when preparing the catalysts instead of the 0.1% solids used in determining ion exchange capacity.

Table 14 also illustrates the resistance to pore diffusion exhibited by the commercial catalysts.

Table 14 also indicates hydrodesulfurization (HDS) of the TAM catalysts on a per gram basis to be considerably less than that of Shell 324. This is probably due to low Mo loading; the activity of the TAM catalysts on a per gram of Mo basis is greater than Shell 324. Also, the ratio of biphenyl to cyclohexyl benzene is greater for the TAM catalysts than Shell 324 or the amorphous catalysts. The ratio for the TAM catalysts also depends on the method of preparation. The TAM compositions are novel compositions which show high hydrogenation activities when used as precursors for sulfided Ni—Mo catalysts.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results.

Variations and modifications of the present invention will be obvious to those skilled in the art and it is intended to cover in the appended claims all such modifications and equivalents. The entire disclosures of all references cited above are hereby incorporated by reference.

What is claimed is:

1. A silico-titanate composition comprising the formula and having a mole ratio as follows:

xM:ySi:aTi:zMD wherein:
M is a cation and is an element of Group I or II of the Periodic Table, H, ammonium or alkylammonium cation;
MD is a metal dopant from elements of Group III, V, IV, VIII or I of the Periodic Table; and:
(a) the composition comprises H, ammonium or alkylammonium cation and has a crystalline structure that exhibits as its primary x-ray diffraction line one at a 2θ of 11.00 or less;
(b) when x:y<1.0, the composition comprises a crystalline structure that exhibits as its primary x-ray diffraction line one at a 2θ less than 11.0, and
(c) when x:y>1.0, the composition comprises a crystalline structure that exhibits as its primary x-ray diffraction line one at a 2θ greater than 9.0; and
y:a is 0.01 to less than about 1;
z:a is 0.0 to 1.0;
x:a is 0.0 to 2.0;
z is 0.0 to 2.0;
x is 0.0 to 2.0;
y is 0.01 to 0.96; and
a is 1.0.

2. The composition of claim 1 wherein the metal dopant comprises a member selected from the group consisting of niobium, antimony, vanadium, copper, manganese, iron, phosphorus, and tantalum.

3. The composition of claim 1 further comprising a member selected from a group consisting of palladium, platinum, rhodium, molybdenum, and nickel.

4. A method of making silico-titanate compositions, comprising the steps of:
(a) providing a reaction mixture containing a titanium source and a silicon source; and
(b) allowing the resulting mixture to react to form the silico-titanate composition having a general formula and a mole ratio as following:

ySi:aTi;

wherein y comprises a coeffecient of 0.01 to 0.96 and a comprises a coefficient of a=1.0.

5. The method of claim 4, wherein the step of providing a reaction mixture further comprises providing a metal dopant MD and allowing the resulting mixture to react to form silico-titanate composition having the general formula and mole ratio ySi:aTi:zMD.

6. The method of claim 5, wherein the step of providing a metal dopant MD comprises providing a member selected from the group consisting of niobium, antimony, vanadium, and tantalum.

7. The method of claim 5, wherein z is a coefficient having a range of approximately 0.0 to 1.0.

8. The method of claim 4, wherein the step of providing a reaction mixture further comprises providing a cation M and allowing the resulting mixture to react to form a silico-titanate composition having the general formula and mole ratio xM:ySi:aTi.

9. The method of claim 8, wherein the step of providing a cation M comprises providing a member selected from the group consisting of Group I elements, Group II elements, H, ammonium cations and alkylammonium cations.

10. The method of claim 8, wherein x is a coefficient having a range of approximately 0.0 to 1.0.

11. The method of claim 4, wherein the step of providing a reaction mixture comprises further providing a member selected from the group consisting of palladium, platinum, rhodium, molybdenum, and nickel.

12. The method of claim 4, wherein the step of providing a reaction mixture comprises providing at least one titanium source selected from the group consisting of titanium alkoxides, titanium halogens, and titanium oxides.

13. The method of claim 4, wherein the step of providing a reaction mixture comprises providing at least one silicon source selected from the group consisting of tetraethyl orthosilicate, colloidal silica, silicon oxides, and sodium silicates.

14. The method of claim 4, further comprising the step of providing the composition to a support comprising a thin film.

15. A silico-titanate composition having the general formula and mole ratio ySi:aTi and having a shape selected from the group consisting of an elongated strand, a parallepiped having approximately 90 degree angles, cuboidal, ellipsoidal, and spherical and wherein y comprises a coefficient of 0.01 to 0.96 and a=1.

16. The composition of claim 15, wherein the spherical shape of said silico-titanate composition comprises a collection of elongated strands.

17. A crystalline niobium-doped titanosilicate containing a framework molar ratio of niobium to titanium of at least 0.1 and having a x-ray powder diffraction pattern substantially as set forth in FIG. 11 of the drawings.

18. Crystalline niobium-doped titanosilicate according to claim 17, which contains ion-exchangeable cations and in which the molar proportions of exchangeable cations, metal dopant, silicon and titanium are expressed in the formula $$xM:zMD:wNb:ySi:aTi$$

wherein "M" represents exchangeable cations, "MD" represents metal dopants other than niobium, "x" has a value of from 0 to 2, "z" has a value of from zero to 3, "y" has a value of from 0 to 0.96, "w" has a value of from 0 to 1, and "a" has a value of 1.0.

19. Composition according to claim 18, wherein "M" is at least one element selected from hydrogen, ammonium, alkylammonium, and metals of Groups I and II of the Periodic Chart and "MD" is at least one metal other than niobium selected from Groups I, III, IV, VI, VII and VIII of the Periodic Chart.

* * * * *

UNITED STATES PATENT AND TRADEMARK OFFICE
CERTIFICATE OF CORRECTION

PATENT NO. : 6,479,427 B1
DATED : November 12, 2002
INVENTOR(S) : Rayford G. Anthony et al.

It is certified that error appears in the above-identified patent and that said Letters Patent is hereby corrected as shown below:

Column 4,
Line 41, after "TAM-3," delete "TAM-S" and insert -- TAM-5 --.

Column 6,
Line 21, after "25º" delete "C." and insert -- C --.
Line 22, after "370º" delete "C." and insert -- C -- and after "140º" delete "C." and insert -- C --. and after "330º" delete "C." and insert -- C --.
Line 23, after "140º" delete "C." and insert -- C -- and after "250º" delete "C." and insert -- C --.
Line 24, after "170º" delete "C." and insert -- C --.
Table 1, Heading, Column 9, after "Temp ºC" delete ".".
Table 2, Heading, Column 10, after "Temp ºC" delete ".".

Columns 7 and 8,
Table 2 - continued: Heading, Column 10, after "Temp °C" delete ".".
Under "Table 3" insert -- MOLE RATIOS, TIME, AND TEMPERATURES USED IN PREPAREIN TAM-5 (UNDOPED) --.
Table 3, Heading, Column 8, after "Temp °C" delete ".".
Table 4, Heading, Column 6, after "Temp °C" delete ".".
Table 4 - continued: Heading, Column 6, after "Temp °C" delete ".".
Table 5, Heading, Column 8, after "Temp °C" delete ".".
Table 5, after "Note:", delete "TAM-S" and insert -- TAM-8 -- and delete "substituted" and insert -- substituted --.

Column 9,
Line 53, after "10° C" delete ".".
Line 55, after "170° C" delete ".".
Line 56, after "170° C" delete ".".
Line 67, after "148° C" delete ".".

Column 10,
Line 3, after "148° C" delete "." and after "170° C" delete ".".
Line 13, after "140° C" delete ".".
Line 15, after "`145° C" delete ".".
Lines 16 and 47, after "170° C" delete ".".
Line 32, after "27.5° C" delete ".".
Line 45, after "26° C" delete ".".
Line 61, after "27° C" delete ".".
Line 64, after "228° C" delete ".".

UNITED STATES PATENT AND TRADEMARK OFFICE
CERTIFICATE OF CORRECTION

PATENT NO. : 6,479,427 B1
DATED : November 12, 2002
INVENTOR(S) : Rayford G. Anthony et al.

It is certified that error appears in the above-identified patent and that said Letters Patent is hereby corrected as shown below:

<u>Column 11,</u>
Line 17, after "35° C" delete ".".
Line 19, after "220° C" delete ".".
Line 39, after "170° C" delete ".".

<u>Column 12,</u>
Line 47, after "170° C" delete ".".

<u>Column 14,</u>
Lines 30, 41, 53 and 64, after "170° C" delete ".".

<u>Column 15,</u>
Line 9, after "170° C" delete ".".

<u>Column 19,</u>
Line 25, in the heading, delete "POSRE" and insert -- PORE --.
Line 32, delete "SML" and insert -- SNL --.

<u>Column 20,</u>
Line 1, "all" should be underlined.

<u>Column 21,</u>
Line 4, after "170° C" delete ".".
Line 7, after "140-230° C" delete ".".
Line 24, delete "TAM-S" and insert -- TAM-5 --.
Line 62, after "100° C" delete ".".
Lines 63 and 66, after "275° C" delete ".".

<u>Column 22,</u>
Line 28, after "92° C" delete ".".
Table VIII, Under heading "SRD $C_O,Å$", Line 3, delete "12.016" and insert -- 12.018 --.

<u>Column 23,</u>
Line 51, after "(25° C" delete ".".

<u>Column 24,</u>
Table X: Under heading "(Nb, Ti)-oxide "rods"", Line 10, delete "-1%", and insert -- ~1% --.

UNITED STATES PATENT AND TRADEMARK OFFICE
CERTIFICATE OF CORRECTION

PATENT NO. : 6,479,427 B1
DATED : November 12, 2002
INVENTOR(S) : Rayford G. Anthony et al.

It is certified that error appears in the above-identified patent and that said Letters Patent is hereby corrected as shown below:

Column 25,
Table XII, Heading, Column 2, after "(°C" delete ".".
Table XII, Heading, Column 4, after "(°C" delete ".".
Line 60, after "5.7", delete "M" and insert -- $\underline{M}$ --.
Line 61, after "0.6", delete "M" and insert -- $\underline{M}$ --.

Column 27,
Table 14, Heading, Column 3, delete "No.%$^a$" and insert -- Mo, %$^a$ --.
Table 14, Heading, Column 5, delete "SA,m$^2$/g$^c$" and insert -- SA,m$^2$/g$^a$ --.
Table 14, Heading, Column 10, delete "K$_{KDS}$$^f$" and insert -- K$_{HDS}$$^f$ --.
Table 14, Column 1, Line 7, delete "NiHO" and insert -- NiMO --
Table 14, Column 1, Line 17, delete "yyNiMe—Na$_{0.3}$Ti$^b$" and insert
-- yyNiMn–Na$_{0.5}$Ti$^b$ --.
Table 14, Column 1, Line 18, delete "NiMo–Na$_{0.3}$TiSi$_{0.25}$$^b$:" and
insert -- NiMo=Na$_{0.5}$TiSi$_{0.25}$$^b$ --.
Table 14, Footnote $^b$, delete "NiHO" and insert -- NiMO --.

Column 28,
Line 18, after "65º C" delete ".".
Line 21, after "500° C" delete ". ".
Line 28, after "300° C" delete ".".

Column 30,
Line 16, delete "following:" and insert -- follows: --.

Signed and Sealed this

First Day of July, 2003

JAMES E. ROGAN
*Director of the United States Patent and Trademark Office*